United States Patent
Chang

(10) Patent No.: US 12,194,859 B2
(45) Date of Patent: Jan. 14, 2025

(54) ELECTRIC VEHICLE, AUTOMATIC DRIVING METHOD AND DEVICE, AUTOMATIC FREIGHTING METHOD AND SYSTEM

(71) Applicant: Ta-peng Chang, New Taipei (CN)

(72) Inventor: Ta-peng Chang, New Taipei (CN)

(73) Assignee: Ta-Peng Chang, New Taipei (TW)

( * ) Notice: Subject to any disclaimer, the term of this patent is extended or adjusted under 35 U.S.C. 154(b) by 400 days.

(21) Appl. No.: 17/614,263

(22) PCT Filed: May 29, 2020

(86) PCT No.: PCT/CN2020/093443
§ 371 (c)(1),
(2) Date: Nov. 24, 2021

(87) PCT Pub. No.: WO2020/239099
PCT Pub. Date: Dec. 3, 2020

(65) Prior Publication Data
US 2022/0227236 A1    Jul. 21, 2022

(30) Foreign Application Priority Data

May 29, 2019  (CN) .......................... 201910454297.1
May 29, 2019  (CN) .......................... 201920785786.0
(Continued)

(51) Int. Cl.
*B60L 15/20*      (2006.01)
*B60K 7/00*       (2006.01)
(Continued)

(52) U.S. Cl.
CPC ............ *B60L 15/20* (2013.01); *B60K 7/0007* (2013.01); *B60P 7/13* (2013.01); *G06Q 10/08* (2013.01);
(Continued)

(58) Field of Classification Search
CPC .............. B60L 15/20; B60L 2240/12; B60L 2240/642; B60K 7/0007; B60P 7/13; G06Q 10/08
See application file for complete search history.

(56) References Cited

U.S. PATENT DOCUMENTS 9,127,872 B1     9/2015  Chainey
2004/0129491 A1  7/2004  Bean et al.
(Continued)

FOREIGN PATENT DOCUMENTS

CN    201890265 U    7/2011
CN    104085362 A    10/2014
(Continued)

OTHER PUBLICATIONS

English Translation of CN 105172935 A Author: Ziming Qi Title: Electric Car Date: Dec. 23, 2015 (Year: 2015).*
(Continued)

*Primary Examiner* — James J Lee
*Assistant Examiner* — Steven Vu Nguyen
(74) *Attorney, Agent, or Firm* — Fox Rothschild LLP

(57) ABSTRACT

The present disclosure provides an electric vehicle, an automatic driving method and device, and an automatic freighting method and system. The electric vehicle includes a plurality of wheel assemblies independent of each other, each wheel assembly has a wheel and an independent power system including a driving device and a displacement device; the driving device can drive the wheel to rotate, and the displacement device can drive at least the wheel to move in a width direction of a vehicle body of the electric vehicle. When the electric vehicle is used to carry passengers, driving needs of high flexibility, high stability, high safety and high comfort can be meet; and when the electric vehicle is used to carry goods, freighting needs of fully automation,
(Continued)

high efficiency, high accuracy, low cost and high safety can be meet.

18 Claims, 26 Drawing Sheets

(30) Foreign Application Priority Data

May 25, 2020 (CN) .......................... 202010448097.8
May 25, 2020 (CN) .......................... 202020891213.9

(51) Int. Cl.
*B60P 7/13* (2006.01)
*G06Q 10/08* (2024.01)

(52) U.S. Cl.
CPC ..... *B60L 2240/12* (2013.01); *B60L 2240/642* (2013.01)

(56) References Cited

U.S. PATENT DOCUMENTS

| | | | |
|---|---|---|---|
| 2006/0215966 | A1 | 9/2006 | Nagano et al. |
| 2008/0091309 | A1 | 4/2008 | Walker |
| 2017/0043622 | A1* | 2/2017 | Merkel .............. B60B 35/1054 |
| 2017/0174263 | A1 | 6/2017 | Thompson et al. |
| 2017/0210192 | A1 | 7/2017 | Reybrouck et al. |
| 2019/0113935 | A1 | 4/2019 | Kuo et al. |
| 2019/0152376 | A1 | 5/2019 | Schwartz et al. |
| 2019/0193462 | A1* | 6/2019 | Matsuoka .............. B60Q 1/507 |
| 2019/0265702 | A1 | 8/2019 | Igata et al. |

FOREIGN PATENT DOCUMENTS

| | | | |
|---|---|---|---|
| CN | 104192083 | A | 12/2014 |
| CN | 105172935 | A | 12/2015 |
| CN | 205075812 | U | 3/2016 |
| CN | 205523412 | U | 8/2016 |
| CN | 106938677 | A | 7/2017 |
| CN | 107097589 | A | 8/2017 |
| CN | 108146449 | A | 6/2018 |
| CN | 110143127 | A | 8/2019 |
| CN | 209870097 | U | 12/2019 |
| CN | 212148439 | U | 12/2020 |
| DE | 102013004951 | A1 | 9/2014 |
| EP | 2251211 | A2 | 11/2010 |
| EP | 2388153 | A1 | 11/2011 |
| FR | 2844245 | A1 | 3/2004 |
| JP | 4222954 | B2 | 2/2009 |
| TW | M440917 | U | 11/2012 |
| TW | I485085 | B | 5/2015 |
| TW | 201915629 | A | 4/2019 |
| WO | 2006101463 | A1 | 9/2006 |

OTHER PUBLICATIONS

Chinese Office Action issued on Nov. 9, 2022 for Chinese Patent Application No. 202010448097.8 (9 pages).
Supplementary Partial European Search Report issued on Mar. 23, 2023 for European Patent Application No. 20813593.9 (17 pages).
Extended European Search Report issued on May 16, 2023 for European Patent Application No. 20813593.9 (18 pages).
"Picnic runner Amersfoort Frank Boumeester." YouTube, uploaded by Picnic I.S. M. Bdumedia, Oct. 3, 2018, https://www.youtube.com/watch?v=YR5MuOdUbkw&t=82s.
"Driiving dynamics and ride comfort," Audi MediaCenter, https://www.audi-mediacenter.com/en/audi-allroad-quattro-concept-2498/driving-dynamics-and-ride-comfort-2520, Accessed online on Mar. 15, 2023 (2 pages).

\* cited by examiner

Control wheels to rotate at same speed by driving devices, control track width along width direction of vehicle body to be increased as running speed increases, by displacement devices, and control ground clearance of chassis to be reduced as running speed increases, by lifting devices of plurality groups of wheel assemblies, when electric vehicle is running straight — S210

Control speed of outside wheels to be greater than speed of inside wheels by driving devices, control outside wheels to move outward relative to inside wheels, along width direction of vehicle body, by displacement devices, and control ground clearance of outside part of chassis to be grater than ground clearance of inside part of chassis by lifting devices, when electric vehicle is turning — S220

Control ground clearance of part of chassis located upstream of slop to be less than ground clearance of part of chassis located downstream of slop by lifting devices, to reduce gradient of electric vehicle, when electric vehicle passes slope — S230

FIG. 17

ELECTRIC VEHICLE, AUTOMATIC DRIVING METHOD AND DEVICE, AUTOMATIC FREIGHTING METHOD AND SYSTEM

CROSS-REFERENCE TO RELATED APPLICATIONS

This application is based upon PCT patent application No. PCT/CN2020/093443, filed on May 29, 2020, which claims priority to Chinese Patent Application Nos. 201910454297.1 and 201920785786.0 filed on May 29, 2019, and Chinese Patent Application Nos. 202010448097.8 and 202020891213.9 filed on May 25, 2020. The contents of these applications are incorporated herein by reference.

TECHNICAL FIELD

The present disclosure relates to a field of vehicle technology, more particularly, to an electric vehicle, an automatic driving method and device, and an automatic freighting method and system.

BACKGROUND

Under the influence of energy problems and environment problems, energy-saving and environmentally friendly electric vehicles are gradually developed in the vehicle industry. Electric vehicles have advantages of no pollution, low noise and simple structure.

However, the existing electric vehicle is single functional and cannot adapt to different driving conditions and different road conditions. For example, the control of the existing electric vehicle is inconvenient when turning, the chassis is not stable when running at high speed, the maneuverability is poor when running at low speed, and the chassis vibration is obvious when encountering rough road conditions.

In addition, in order to increase driving distance and save power, the weight of the chassis of the existing electric vehicle is continuously reduced, which gradually reduces the stability of the electric vehicle. Risk of the electric vehicle will increase sharply due to the reduction of the stability, especially in the cases of high-speed running, turning and rough roads.

SUMMARY

The present disclosure provides an electric vehicle, an automatic driving method and device, and an automatic freighting method and system. Each of wheel assemblies of the electric vehicle has an independent power system, a wheel of each of the wheel assemblies is independently controlled by a driving device and a displacement device. Therefore, when the electric vehicle is used to carry passengers, driving needs of high flexibility, high stability, high safety and high comfort can be meet; and when the electric vehicle is used to carry goods, freighting needs of fully automation, high efficiency, high accuracy, low cost and high safety can be meet.

According to a first aspect of the present disclosure, an electric vehicle is provided. The electric vehicle includes a plurality of wheel assemblies installed on a lower surface of a chassis, the plurality of the wheel assemblies are independent of each other, and each of the wheel assemblies comprises a wheel, a driving device and a displacement device; the driving device is configured to drive the wheel to rotate, and the displacement device is configured to drive at least the wheel to move in a width direction of a vehicle body of the electric vehicle.

In some embodiments, the displacement device, the driving device and the wheel are sequentially arranged from inside to outside along the width direction of the vehicle body; the driving device is connected to and drives the wheel through a rotating shaft; the displacement device is connected to the driving device through a telescopic shaft, and the displacement device drives the driving device and the wheel through the telescopic shaft.

In some embodiments, the displacement device includes a first electric motor fixed to the chassis, a first end of the telescopic shaft is telescopically connected to the first electric motor, and a second end of the telescopic shaft is connected to the driving device.

In some embodiments, the driving device includes a housing fixed to the chassis and a second electric motor accommodated in the housing; two opposite inner walls of the housing are provided with guide rails extending in the width direction of the vehicle body, and two opposite side walls of the second electric motor are connected to the guide rails through rotating pivots, respectively; driven by the first electric motor, the second electric motor slides in the guide rails through the rotating pivots, and drives the wheel to move in the width direction of the vehicle body.

In some embodiments, when the wheel jumps in a direction perpendicular to the chassis, the second electric motor is driven to swing by the wheel through the rotating pivots, and the rotating pivots are rotated in the guide rails along with swing of the second electric motor.

In some embodiments, a first end of the rotating shaft is rotatably connected to the second electric motor, and a second end of the rotating shaft is connected to the wheel through a first rotating joint; and, the second end of the telescopic shaft is connected to the second electric motor through a second rotating joint.

In some embodiments, the rotating shaft is connected to the chassis through a first elastic member capable of elastically stretching and compressing in the direction perpendicular to the chassis, a first end of the first elastic member is fixedly connected to the chassis, and a second end of the first elastic member is movably connected to the rotating shaft through a connector.

In some embodiments, each of the wheel assemblies further includes a lifting device through which the housing is connected to the chassis, the lifting device may raise and lower in the direction perpendicular to the chassis, to adjust ground clearance of the chassis; and, a side wall of the housing is connected to the chassis through a connecting rod, a first end of the connecting rod is fixedly connected to the chassis, and a second end of the connecting rod is connected to the side wall of the housing through a third rotating joint.

In some embodiments, the lifting device is an electric lifter or a second elastic member.

In some embodiments, in each of the wheel assemblies, the wheel includes a plurality of tires arranged along the width direction of the vehicle body, and the plurality of the tires are connected to the driving device through the rotating shaft.

In some embodiments, each of the wheel assemblies is provided with a wheel cover, including: a cover body covering outside the wheel; a prompt module provided on an outer surface of the cover body, wherein the prompt module is configured to generate prompt information when the wheel moves; and a soft waterproof sheet provided below a rear surface of the cover body.

In some embodiments, the electric vehicle is used to carry passengers.

In some embodiments, the electric vehicle is used to carry goods.

In some embodiments, the electric vehicle further includes: a fixing frame provided on a carrying surface of the electric vehicle, the carrying surface is located on an upper surface of the chassis, and the fixing frame is provided with a sliding channel and a switch controlling at least the sliding channel; a freight container capable of being pushed into the fixing frame through the sliding channel, when the freight container is pushed into the fixing frame, the switch closes at least part of the sliding channel, making the freight container fixed to the carrying surface.

In some embodiments, the storage compartment is replaceable, to make the freight container have combinations of storage compartments with different capacities.

In some embodiments, a plurality of replaceable storage compartments with different capacities are provided in the freight container, and each of the storage compartments is configured to store a piece of goods through a turnover box; the freight container further includes a first memory storing user information and storage path for each piece of the goods, the user information indicates a target user and a destination address of each piece of the goods, and the storage path indicates the turnover box and the storage compartment storing each piece of the goods.

In some embodiments, the storage path of each piece of the goods is generated according to a first identification code of the freight container, a second identification code of the storage compartment corresponding to the piece of the goods, and a third identification code of the turnover box corresponding to the piece of the goods.

In some embodiments, the switch is a split type switch including a first switch contact provided on the freight container and a second switch contact provided on the fixing frame; when the freight container is pushed into the fixing frame, the split type switch is switched on and the first memory exchanges data with the electric vehicle.

In some embodiments, the fixing frame includes a plurality of connected right-angle plates, and side plates providing the sliding channel, the freight container is pushed into the fixing frame from the side plates, and part of side edges of the freight container is embedded in inner walls of the right-angle plates; the switch is an electrically controlled switch or a telescopic switch provided on the side plates.

In some embodiments, a plurality of rotatable cameras for detecting surroundings and aerials for the cameras to communicate with the electric vehicle are provided on the fixing frame; the cameras are provided at least at a front end, a rear end, and one or more sides of the electric vehicle along a forward direction, and the aerials are provided on the top of the fixing frame; and, one or more scanners, one or more talkers and one or more alarms are further provided on the fixing frame.

In some embodiments, one or more sides of the freight container is provided with an electronic display screen for displaying mobile advertisement.

In some embodiments, the chassis of the electric vehicle is provided with a battery slot, and a battery pack of the electric vehicle is detachably installed in the battery slot.

According to a second aspect of the present disclosure, an automatic driving method applied on the electric vehicle for carrying passengers or goods as described in any of the above embodiments is provided. The automatic driving method includes the following steps of: transmitting a track width increasing signal to each of the wheel assemblies, to instruct the displacement device of each of the wheel assemblies to drive each wheel to extend away from a center of the electric vehicle, along the width direction of the vehicle body, when a running speed of the electric vehicle is greater than a first preset value; transmitting a track width decreasing signal to each of the wheel assemblies, to instruct the displacement device of each of the wheel assemblies to drive each wheel to retract towards the center of the electric vehicle, along the width direction of the vehicle body, when the running speed of the electric vehicle is less than a second preset value; wherein the first preset value is greater than the second preset value; and, transmitting a first speed signal to inside group of the wheel assemblies, to instruct the driving devices of the inside group of the wheel assemblies to drive inside wheels to move forward at a first speed, and transmitting a second speed signal to outside group of the wheel assemblies, to instruct the driving devices of the outside group of the wheel assemblies to drive outside wheels to move forward at a second speed, when the electric vehicle is turning; wherein the second speed is greater than the first speed.

In some embodiments, the automatic driving method further includes: when the electric vehicle is turning, transmitting a retracting signal to the inside group of the wheel assemblies, to instruct the displacement devices of the inside group of the wheel assemblies to drive the inside wheels to retract towards the center of the electric vehicle, along the width direction of the vehicle body; and/or, transmitting an extending signal to the outside group of the wheel assemblies, to instruct the displacement devices of the outside group of the wheel assemblies to drive the outside wheels to extend away from the center of the electric vehicle, along the width direction of the vehicle body.

In some embodiments, the automatic driving method further includes: transmitting a height reducing signal to each of the wheel assemblies, to instruct lifting device of each of the wheel assemblies to reduce ground clearance of the chassis, when the running speed of the electric vehicle is greater than the first preset value; and, transmitting a height increasing signal to each of the wheel assemblies, to instruct the lifting device of each of the wheel assemblies to increase the ground clearance of the chassis, when the electric vehicle is parking.

In some embodiments, the automatic driving method further includes: setting a plurality of preset values for the running speed of the electric vehicle, to adjust the track width of each of the wheel assemblies and/or the ground clearance of the chassis in stages.

In some embodiments, the automatic driving method further includes a step of adjusting driving parameters of the electric vehicle in real time, based on driving conditions of the electric vehicle, the step includes: controlling the wheels to rotate at a same speed by the driving devices, controlling the track width along the width direction of the vehicle body to be increased as the running speed increases, by the displacement devices, and controlling ground clearance of the chassis to be reduced as the running speed increases, by lifting devices of the plurality of the wheel assemblies, when the electric vehicle is running straight; wherein each of the wheel assemblies is connected to the chassis through the lifting device; controlling speed of the outside wheels to be greater than speed of the inside wheels by the driving devices, controlling the outside wheels to move outward relative to the inside wheels, along the width direction of the vehicle body, by the displacement devices, and controlling ground clearance of outside part of the chassis to be greater than ground clearance of inside part of the chassis by the lifting devices, when the electric vehicle is turning; and, controlling ground clearance of the chassis located upstream of a slop to be less than ground clearance of a part of the chassis located downstream of the slop by the lifting devices, to reduce gradient of a part of the electric vehicle, when the electric vehicle passes the slope.

In some embodiments, each of the wheel assemblies includes at least two tires arranged in the width direction of the vehicle body, and the automatic driving method further includes: increasing track width along the width direction of the vehicle body between the tires of the wheel assembly located at a hollow, to avoid the hollow, by the displacement device of the wheel assembly located at the hollow, when the electric vehicle passes the hollow; or, driving the tires of the wheel assembly located at the hollow to extend or retract in the width direction of the vehicle body, to avoid the hollow, by the displacement device of the wheel assembly located at the hollow, when the electric vehicle passes the hollow.

According to a third aspect of the present disclosure, an electronic device is provided, including: a processor; a memory storing executable instructions executed by the processor; the processor is configured to execute the steps of the automatic driving method as described in any of the above embodiments, by executing the executable instructions; the electronic device is configured in the electric vehicle, and the electronic device is configured to communicate with a navigation system and an automatic driving system to control each of the wheel assemblies.

According to a four aspect of the present disclosure, a freighting driving method applied on the electric vehicle for carrying goods as described in any of the above embodiments is provided. The automatic freighting method includes steps of: receiving first goods to be distributed and obtaining user information of each piece of the first goods, in a receiving area of a distribution center; fitting each piece of the first goods into a turnover box according to a size of each piece of the first goods; automatically transporting the turnover boxes together with the first goods to a dispatch area of the distribution center, wherein a plurality of empty freight containers and fully-charged electric vehicles are arranged in the dispatch area; loading the turnover boxes together with the first goods into storage compartments of the freight containers, ensuring that the first goods in a same freight container have a same target area, and obtaining storage path of each piece of the first goods; loading the fright container onto the carrying surface to form the electric vehicle, wherein the user information and the storage path of each piece of the first goods are stored in a memory of the electric vehicle; and, controlling the electric vehicle to automatically distribute the first goods in the freight container.

In some embodiments, the step of controlling the electric vehicle to automatically distribute the first goods in the freight container includes: generating a distribution route, a pickup time and a pickup location of each piece of the first goods, and a pickup code of each piece of the first goods related to its storage path, according to a destination address of each piece of the first goods in the freight container; transmitting the distribution route to the electric vehicle, and transmitting the pickup time, the pickup location and the pickup code to a target user of each piece of the first goods; when the electric vehicle arrives at a pickup location, obtaining a pickup code by a scanner of the electric vehicle, and confirming whether the pickup code is correct; when the pickup code is correct, informing a target user of a location of the storage compartment corresponding to the pickup code, and instructing the freight container to open the storage compartment corresponding to the pickup code for the target user to pick up one piece of the first goods; and, detecting whether a door of the storage compartment is closed, and transmitting a return notification to the target user when the door is not closed, and the electric vehicle will continue to move on after detecting that the door of the storage compartment is closed.

In some embodiments, the automatic freighting method further includes: receiving a sending request, wherein the sending request includes sender information and recipient information, and the sender information comprises at least a sender, a sender address and a size of a piece of second goods; obtaining an electric vehicle having an empty storage compartment matching the size of the piece of the second goods, and within a target area where the sender address is located; transmitting a sending time, a sending location and a sending code to the sender; and, transmitting a receiving route related to the sending location and the sending time to the electric vehicle.

In some embodiments, the automatic freighting method further includes: when the electric vehicle arrives at the sending location, obtaining the sending code by the scanner, informing the sender of a location of the empty storage compartment, and instructing the freight container to open the empty storage compartment; detecting whether a door of the empty storage compartment is closed, and transmitting a return notification to the sender when not closed, and the electric vehicle will continue to move on after detecting that the door of the empty storage compartment is closed; controlling the electric vehicle to run to an unloading area of the distribution center after the electric vehicle is full-load with the second goods; unloading the fright container and its internal turnover boxes and second goods, and returning the electric vehicle and the fright container to the dispatch area; automatically transporting the turnover boxes together with the second goods to a corresponding transfer area, according to the recipient information of each piece of the second goods; unloading the second goods for transferring, and returning the turnover boxes to the receiving area; and, the second goods in the transfer area are collected in a transport vehicle, and transported to corresponding distribution center in destination city, or transported to distant distribution center via airport.

According to a fifth aspect of the present disclosure, an automatic freighting system for implementing the automatic freighting method as described in any of the above embodiments is provided. The automatic freighting system includes: multiple electric vehicles; a control cluster communicating with each of the electric vehicles; and a distribution center including an automatic device for automatically loading and unloading and automatically transporting.

The present disclosure has the following advantages.

Each of the wheel assemblies of the electric vehicle has the independent power system, the wheel of each of the wheel assemblies is independently controlled by the driving device and the displacement device, which improves the flexibility of the electric vehicle. The driving device controls wheel speed, therefore, flexible turning of the electric vehicle can be achieved by a speed difference instead of wheel turning, which improves the stability of the electric vehicle during turning. The displacement device controls extension and retraction of the wheel, to adjust the track width, therefore, the track width can be increased during high-speed driving and be decreased during low-speed driving, which improves the safety and the comfort of the electric vehicle.

When the electric vehicle is used to carry passengers, the driving needs of high flexibility, high stability, high safety and high comfort can be meet; and when the electric vehicle is used to carry goods, the freighting needs of fully automation, high efficiency, high accuracy, low cost and high safety can be meet.

BRIEF DESCRIPTION OF THE DRAWINGS

In order to more clearly explain the technical solutions in embodiments of the present disclosure, the following will briefly introduce drawings used in describing the embodiments of the present disclosure. Obviously, the drawings in the following description are only some of the embodiments of the present disclosure. For those skilled in the art, other drawings can be obtained based on the contents of the embodiments of the present disclosure and these drawings without paying any creative labor.

FIG. 17 is a flow chart showing another automatic driving method of the electric vehicle according to an embodiment of the present disclosure;

DETAILED DESCRIPTION

The present disclosure will be further described in detail below with reference to the drawings and embodiments. It should be understood that the specific embodiments described herein are only used to explain the present disclosure, but not to limit the present disclosure. In addition, it should be noted that, in order to facilitate description, the drawings only show part of but not all structures related to the present disclosure.

In the description of the present disclosure, unless otherwise expressly specified and defined, the terms "connected with", "connected to", and "fixed" should be understood in a broad sense. For example, it can refer to a fixed connection, a detachable connection, or forming an integrated body; it can refer to a mechanical connection or an electrical connection; it can be directly connected, or indirectly connected through an intermediary; it can refer to a connection between two components or interaction between two components. For those skilled in the art, the specific meaning of the above terms in the present disclosure should be understood in context.

In the description of the embodiments, the positional terms "upper", "lower", "right", etc. are based on the drawings, and are only for convenient description and simplified operations, not for indicating or implying that the device or components referred to must have a specific position or be constructed and operated in the specific position. Therefore, the positional terms should not be construed as a limitation of the present disclosure. In addition, the terms "first" and "second" are only used for distinguish in description, and have no special meaning.

Figure 1:
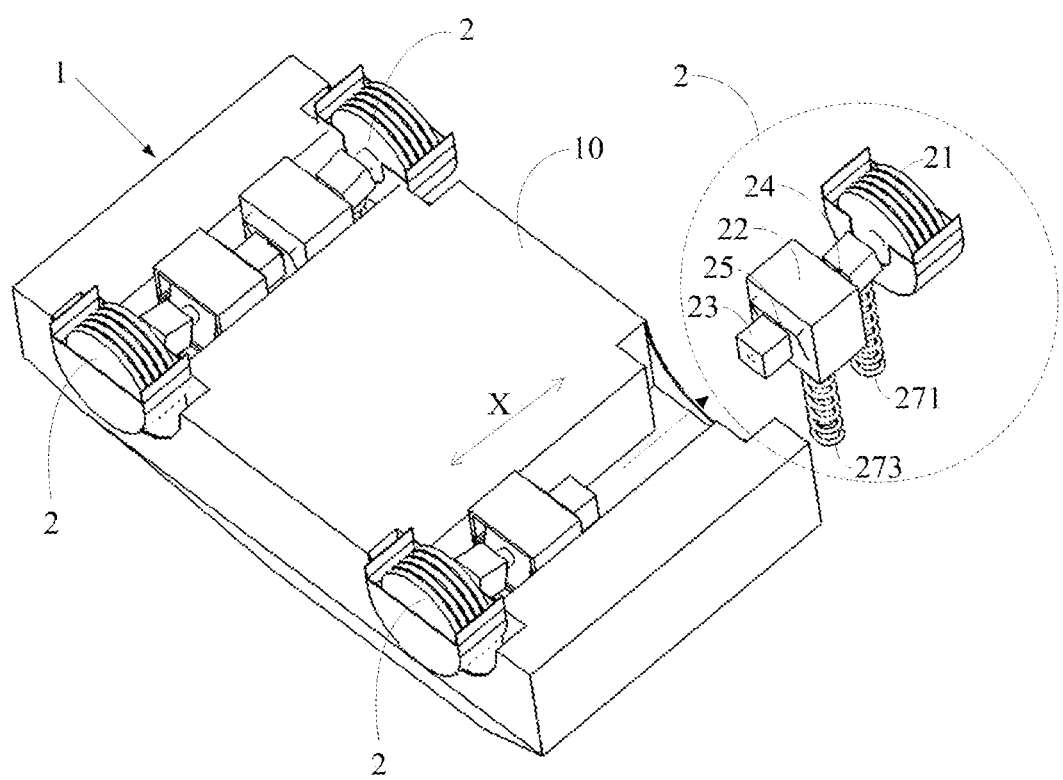
FIG. 1 is a schematic view of an electric vehicle according to an embodiment of the present disclosure.

FIG. 1 shows a structure of an electric vehicle in an embodiment. Referring to FIG. 1, the electric vehicle 1 in this embodiment has a plurality of wheel assemblies 2 provided on a lower surface of a chassis 10. Generally, the electric vehicle 1 has four wheel assemblies 2. In some special embodiments, the electric vehicle 1 can also be equipped with other quantities of the wheel assemblies 2 as needed, such as three assemblies, six assemblies, eight assemblies, and so on. The plurality of the wheel assemblies 2 of the electric vehicle 1 are independent of each other, so the quantity of the wheel assemblies 2 can be flexibly increased or decreased according to configuration of the electric vehicle 1.

Each of the wheel assemblies 2 includes a wheel 21, a driving device 22 and a displacement device 23. The driving device 22 can drive the wheel 21 to rotate. The displacement device 23 can drive at least the wheel 21 to move along a width direction "X" of a vehicle body of the electric vehicle, therefore, the wheel 21 can be extended away from the center of the electric vehicle 1, that is, extended outward, and a track width will be increased; or the wheel 21 can be retracted toward the center of the electric vehicle 1, that is, retracted inward, and the track width will be decreased.

The plurality of the wheel assemblies 2 are independent of each other, each of the wheel assemblies 2 can be flexibly assembled according to the configuration of the electric vehicle 1, and the wheel 21 of each of the wheel assemblies 2 can be independently controlled by the driving device 22 and the displacement device 23 to improve flexibility. The driving device 22 controls a speed of the wheel 21, and the speed of the wheels 21 can be the same with or different from each other. When the electric vehicle 1 turns, the wheel 21 does not need to turn, and the turning of the electric vehicle 1 can be flexibly controlled by a speed difference between the wheels 21. For example, the speed of inside wheels is made smaller than the speed of outside wheels to achieve turning. The displacement device 23 controls the extension and the retraction of the wheel 21 to adjust track width, when driven at high speed, the track width can be increased to improve the stability of the electric vehicle 1, and when driven at low speed, the track width can be decreased to improve the mobility of the electric vehicle 1. Wherein, the track width of the present disclosure includes a track width of two front wheel assemblies 2 and a track width of two rear wheel assemblies 2, the inside wheel assemblies of the present disclosure include a front wheel assembly 2 and a rear wheel assembly 2 near the side to which the electric vehicle turns, and the outside wheel assemblies include a front wheel assembly 2 and a rear wheel assembly 2 far from the side to which the electric vehicle turns.

In some embodiments, in each of the wheel assemblies 2, the displacement device 23, the driving device 22 and the wheel 21 are arranged in order from inside to outside along the width direction "X" of the vehicle body. The driving device 22 is connected to and drives the wheel 21 through a rotating shaft 24, and the displacement device 23 is connected to the driving device 22 through a telescopic shaft 25, and the displacement device 23 drives the driving device 22 and the wheel 21 through the telescopic shaft 25. After the displacement device 23, the driving device 22 and the wheel 21 are assembled, the driving device 22 drives the wheel 21 to rotate through the rotating shaft 24, and each driving device 22 can independently drive and control the speed of the wheel 21; the displacement device 23 drives the driving device 22 together with the wheels 21 to move in the width direction "X" of the vehicle body through the telescopic shaft 25, therefore, the wheels 21 can be telescoped inward and outward and the track width can be adjusted. Wherein, the driving device 22 can be any device capable of rotating driving, and the displacement device 23 can be any device capable of telescopic pushing.

Figure 2:
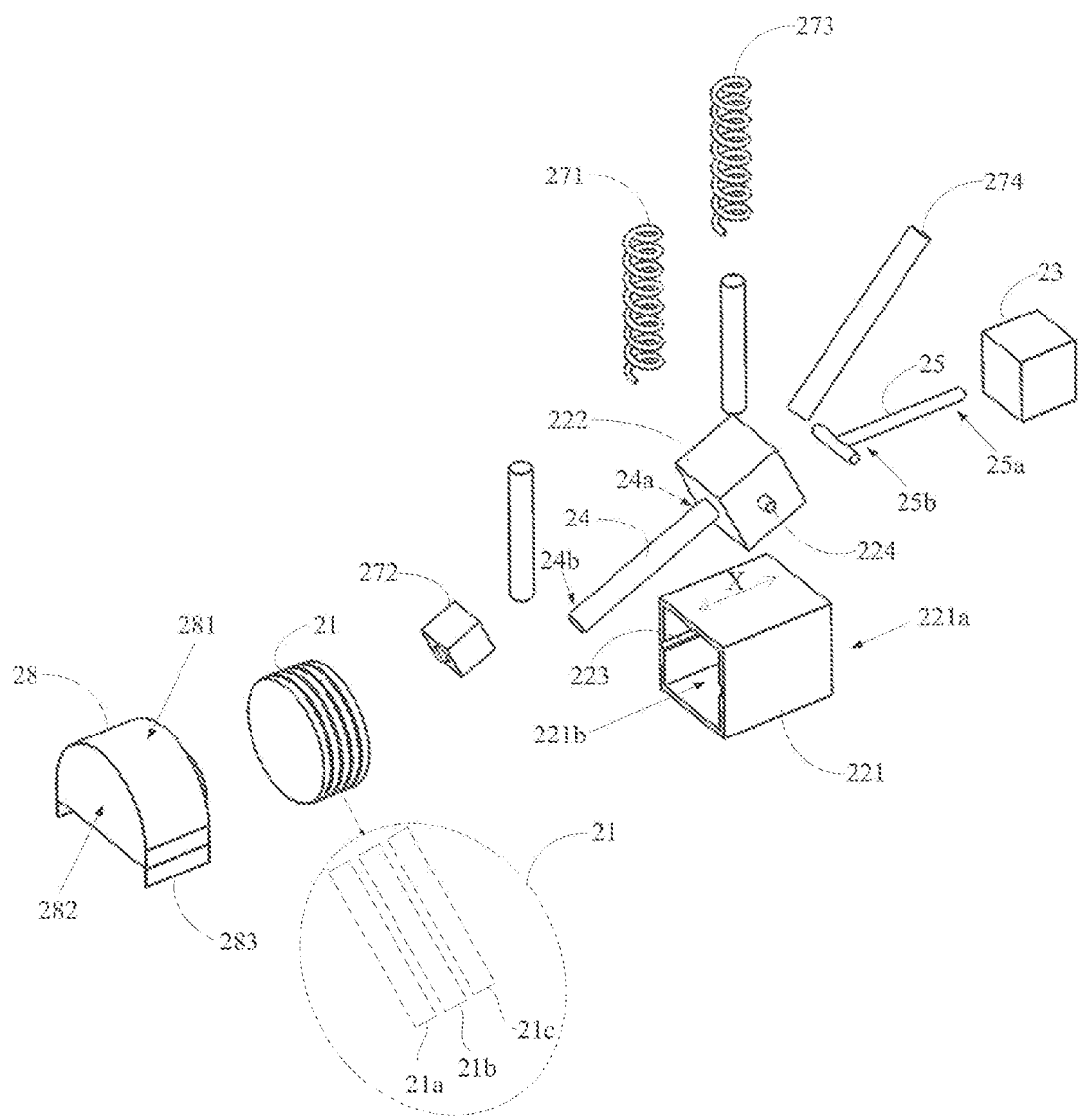
FIG. 2 is an exploded view of a wheel assembly according to an embodiment of the present disclosure.
Figure 3:
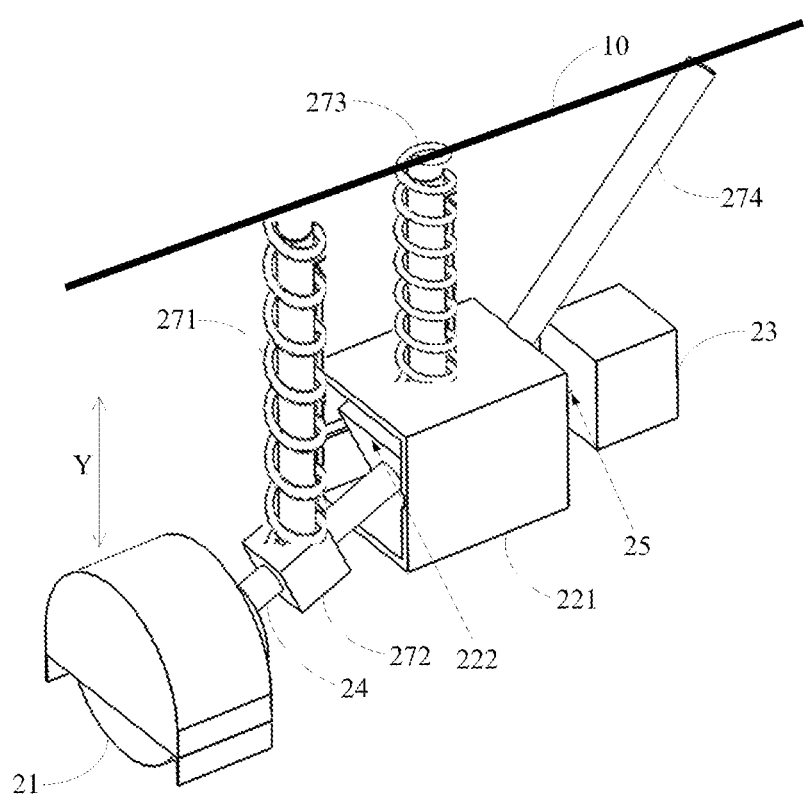
FIG. 3 is an assembled view of the wheel assembly according to an embodiment of the present disclosure.
Figure 4:
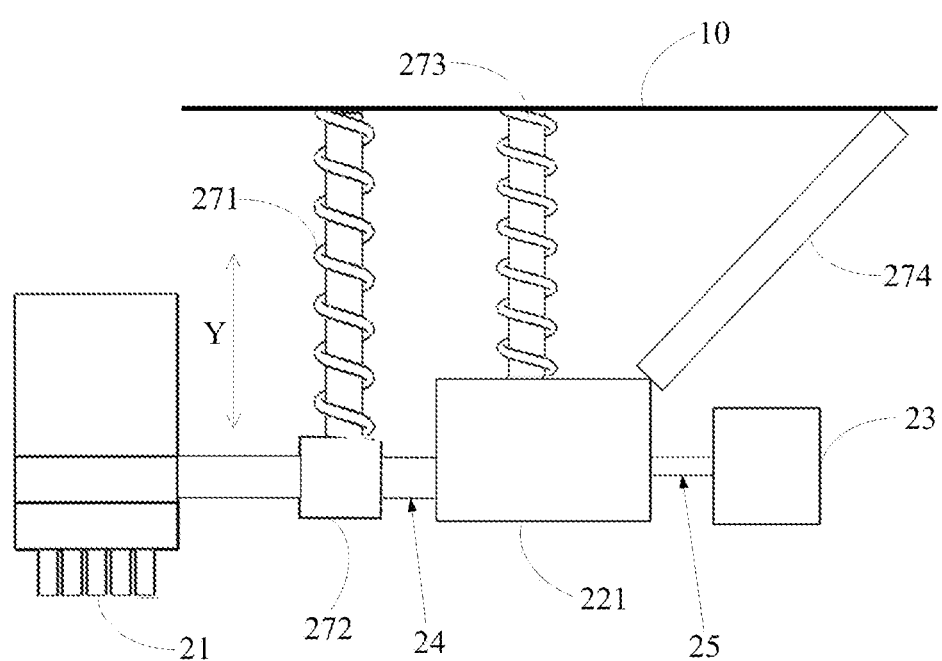
FIG. 4 is a section view of the wheel assembly according to an embodiment of the present disclosure.

FIG. 2 shows an exploded structure of a wheel assembly in an embodiment, FIG. 3 shows an assembled structure of the wheel assembly, and FIG. 4 shows a section structure of the wheel assembly. Referring to FIG. 1 to FIG. 4, in some embodiments, the displacement device 23 is a first electric motor fixed to the chassis 10, a first end 25a of the telescopic shaft 25 is telescopically connected to the displacement device 23, and a second end 25b of the telescopic shaft 25 is connected to the driving device 22. The principle of the displacement device 23 driving the driving device 22 and the wheel 21 is that, the first electric motor generates a driving force to drive the telescopic shaft 25 to extend and retract along the width direction "X" of the vehicle body, thereby driving the driving device 22 to move along the width direction "X" of the vehicle body, and further the wheel 21 is driven to move along the width direction "X" of the vehicle body, and the wheel 21 is telescopic.

Further, the driving device 22 includes a housing 221 fixed to the chassis 10 and a second electric motor 222 accommodated in the housing 221. The housing 221 has a hollow structure. A through hole extending along the width direction "X" of the vehicle body, for the telescopic shaft 25 to pass through and connect to the displacement device 23 and the second motor 222, is provided on a first end face 221a of the housing 221; and a second end face 221b of the 221 has an open structure used to provide space for the second motor 222 to move along the width direction "X" of the vehicle body. Two opposite inner walls of the housing 221 are provided with guide rails 223 extending in the width direction "X" of the vehicle body, and two opposite side walls of the second motor 222 are connected to the guide rails 223 via rotating pivots 224, respectively. The rotating pivot 224 can be a short rotating shaft, one end of which is fixedly connected to the side wall of the second motor 222, and the other end is movably embedded in the guide rail 223. Driven by the displacement device 23, the second motor 222 slides along the guide rail 223 through the rotating pivot 224 and drives the wheel 21 to move in the width direction "X" of the vehicle body. Through the cooperation of the guide rail 223 and the rotating pivot 224, horizontal movement of the second motor 222 can be limited to the width direction "X" of the vehicle body, and stability and smoothness of the movement of the second motor 222 can be ensured, thereby the electric vehicle 1 can keep stable and normal driving will not be affected when the track width is adjusted.

During the running process of the electric vehicle 1, the wheels 21 will jump up and down with bumps of road when encountering uneven rough roads. When the wheel 21 jumps in the direction "Y" perpendicular to the chassis 10, the wheel 21 drives the second motor 222 to swing through the rotating shaft 24, and the rotating pivot 224 rotates in the guide rail 223 in cooperation with the swing of the second motor 222. Therefore, when the wheel 21 jumps, the second motor 222 swings to adapt to road roughness and prevent the chassis 10 from vibrating, and further vibration of the vehicle body can be prevented.

Figure 5:
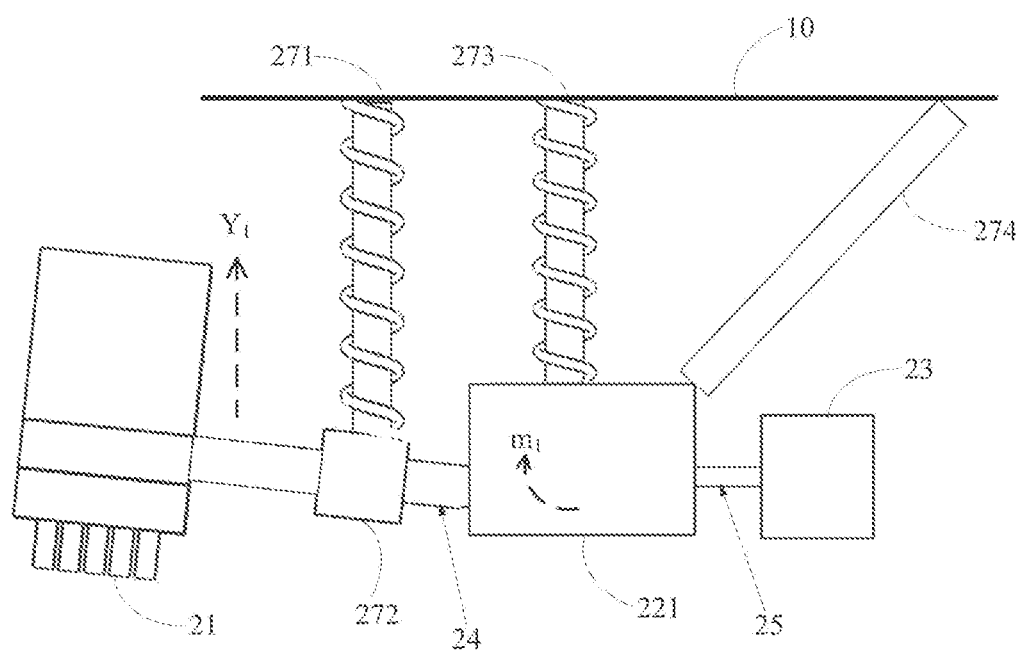
FIG. 5 is a schematic view showing a wheel jumping upward according to an embodiment of the present disclosure.
Figure 6:
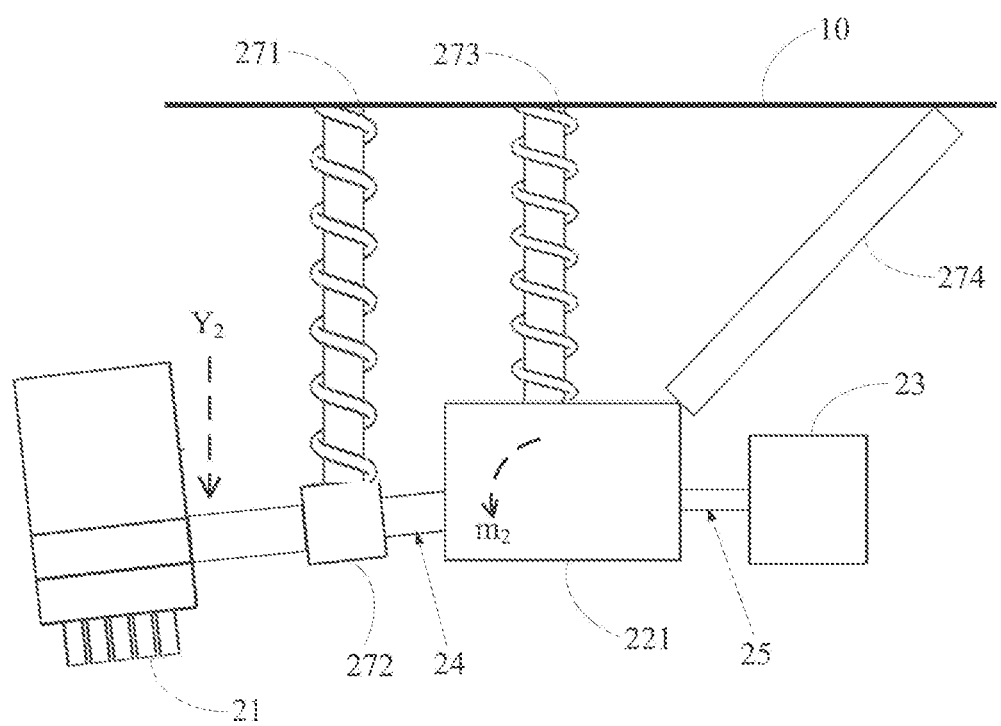
FIG. 6 is a schematic view showing the wheel jumping downward according to an embodiment of the present disclosure.

Specifically, FIG. 5 shows a structure of the wheel jumping upward in an embodiment, and FIG. 6 shows a structure of the wheel jumping downward. Referring to FIG. 1 to FIG. 6, when the wheel 21 jumps upward in an upward direction "$Y_1$" perpendicular to the chassis, the wheel 21 drives the second motor 222 located in the housing 221 to swing upward through the rotating shaft 24. When the second motor 222 swings upward, the rotating pivot 224 is rotated accordingly in the guide rail 223 along a direction of arrow "$f_1$". When the wheel 21 jumps downward in a downward direction "$Y_2$" perpendicular to the chassis, the wheel 21 drives the second motor 222 located in the housing 221 to swing downward through the rotating shaft 24. When the second motor 222 swings downward, the rotating pivot 224 is rotated accordingly in the guide rail 223 along a direction of arrow "$m_2$". Therefore, the wheel 21 jumping due to road roughness can be weakened by the second motor 222 swinging up and down, and the swing of the second motor 222 does not affect the chassis 10, which avoids the vibration of the vehicle body caused by the vibration of the chassis 10. And through the coordinated rotation of the rotating pivot 224, the swing of the second motor 222 is stable and smooth, which ensures the wheel 21 to jump smoothly.

Further, the rotating shaft 24 and the telescopic shaft 25 are both rigid shafts, in order to ensure that the swing of the second motor 222 does not affect its connection with the wheel 21 and the displacement device 23, a first end 24a of the rotating shaft 24 is rotatably connected to the second electric motor 222, a second end 24b of the rotating shaft 24 is connected to the wheel 21 through a first rotating joint, and the second end 25b of the telescopic shaft 25 is connected to the second electric motor 222 through a second rotating joint. The first rotating joint and the second rotating joint may be spherical connectors or other kind of movable connectors. The first rotating joint can ensure that the wheels 21 always adhere to ground over rough roads, and improve the stability and safety of the electric vehicle 1 under rough road conditions; the second rotating joint can ensure that the second motor 222 is steadily connected to the displacement device 23 when it swings.

With continued reference to FIG. 1 to FIG. 6, in order to control the amplitude of the jumps of the wheels 21 and the second electric motor 222, the rotating shaft 24 is connected to the chassis 10 through a first elastic member 271. The first elastic member 271 can be stretched and compressed elastically in the direction "Y" perpendicular to the chassis. A first end of the first elastic member 271 is fixedly connected to the chassis 10, and a second end of the first elastic member 271 is movably connected to the rotating shaft 24 through a connector 272. With the ups and downs of the wheels 21 and the second electric motor 222, the first elastic member 271 is stretched and compressed elastically in the direction "Y" perpendicular to the chassis, which can play a role in limiting the amplitude of the jumps of the wheels 21 and the second electric motor 222, and avoiding causing the vibration of the chassis 10. The first elastic member 271 is a mechanical spring structure to elastically stretch and compress in the direction "Y" perpendicular to the chassis in response to road bumps.

Further, each of the wheel assemblies 2 further includes a lifting device 273, and the housing 221 of the driving device 22 is connected to the chassis 10 through the lifting device 273. The lifting device 273 can go up and down in the direction "Y" perpendicular to the chassis to adjust ground clearance of the chassis. When the ground clearance of the chassis is adjusted, the height of the vehicle body is adjusted accordingly. The lifting device 273 may be a mechanical spring structure to elastically stretch and compress in the direction "Y" perpendicular to the chassis. In some embodiments, the lifting device 273 can actively adjust the ground clearance of the chassis. FIG. 1 to FIG. 6 illustrate that the lifting device 273 is an elastic member, but not limited to this, the lifting device 273 can be any device that can actively go up and down in the direction "Y" perpendicular to the chassis, e.g., an electric lifter or an air spring, which can adjust the ground clearance of the chassis according to a height adjustment signal transmitted from a control module of the electric vehicle 1. When the electric vehicle 1 is running on rough roads, the lifting device 273 can adjust the ground clearance of the chassis according to the distance between the chassis 10 and the road surface, so as to improve the trafficability of the electric vehicle 1 on the rough road. When the electric vehicle 1 is running at a high speed, in order to improve the stability, the lifting device 273 reduce the ground clearance of the chassis to lower the center of gravity of the electric vehicle; when the running speed slows down or the vehicle stops, the lifting device 273 restores the ground clearance of the chassis to facilitate the passengers to get on and off the vehicle. In some embodiments, the lifting device 273 can be configured to adjust the ground clearance of the chassis in real time according to the running speed. When the running speed increases, the ground clearance of the chassis decreases, so as to lower the center of gravity of the electric vehicle and improve driving safety and stability; when the running speed gradually slows down, the ground clearance of the chassis gradually increases. Specific adjustment method is controlled by the control module of the electric vehicle, or configured by the user as needed, and the present disclosure does not limit this. Of course, the lifting device 273 can also play the role of vibration absorption and cushion as described in the first elastic member 271, which further ensures that the chassis 10 is stable and not affected by road bumps.

In some embodiments, a side wall of the housing 221 is connected to the chassis 10 through a connecting rod 274, a first end of the connecting rod 274 is fixedly connected to the chassis 10, and a second end of the connecting rod 274 is connected to the side wall of the housing 221 through a third rotating joint. The connecting rod 274 can reduce the vibration of the chassis 10 and cooperate with the lifting movement of the lifting device 273 to move relative to the housing 221 through its rigid body and the third rotating joint.

In each of the wheel assemblies 2, the wheel 21 may be equipped with a single tire, and can also be equipped with a plurality of tires arranged along the width direction "X" of the vehicle body. For example, FIG. 2 shows the wheel 21 including three tires, namely a first tire 21a, a second tire 21b, and a third tire 21c, but it is not limited to this. Appropriate gaps are provided between the tires, and the tires are all connected to the second motor 222 of the driving device 22 through the rotating shaft 24. Each tire can be a pneumatic rubber tire or a solid plastic tire. The wheel 21 of each of the wheel assemblies 2 can be provided with multiple tires to increase total width of the wheel 21 and contact area with the ground. When the electric vehicle 1 is running on the rough road, wider wheel 21 can reduce the vibration of the chassis 10 and improve the stability and comfort of the electric vehicle 1. In some scenarios, when the electric vehicle 1 is running on the rough road, even if one tire of the wheel 21 is pressed against a concave hole or a raised barrier, the others are still running on flat ground, which can further reduce the vibration of the chassis 10.

In some embodiments, each of the wheel assemblies 2 is provided with a wheel cover. Referring to FIG. 2, the wheel cover includes a cover body 28 covered outside the wheel 21 to improve the aesthetics of the wheel assembly 2; and a prompt module provided on the outer surface of the cover body 28, e.g., surfaces indicated by arrows 281 and 282. Outer surface of the cover body 28 can be provided with an electronic screen, i.e. the prompt module, which is used to generate a prompt message to timely prompt surrounding vehicles, when the wheel 21 is telescopically moved, especially extending away from the center of the electric vehicle 1, along the width direction "X" of the vehicle body. Therefore, the surrounding vehicles can be prompted to avoid colliding with the wheel 21 due to a tiny distance between themselves and the electric vehicle 1 caused by the telescopically movement of the wheel 21. The prompt module may also be a warning light (not specifically shown in the figure) provided on the outer surface of the cover body 28, as long as it can provide a prompting function when the wheel 21 is telescopically moved. The wheel cover further includes a soft waterproof sheet 283 provided below the rear surface of the cover body 28, which is used to block dust and keep the chassis 10 dry and clean during the running of the electric vehicle 1.

The electric vehicle 1 described in the above embodiments can be used to carry passengers or goods. When the electric vehicle 1 is used to carry passengers, a body structure suitable for carrying passenger is provided on the chassis 10, and the electric vehicle 1 will further include doors opened on sides of the body structure, seats provided inside the body structure, etc. The wheel 21 of each of the wheel assemblies of the electric vehicle 1 is independently controlled by the driving device 22 and the displacement device 23, which can improve the flexibility, the stability, the safety and the comfort of the electric vehicle 1. When the electric vehicle 1 is used to carry goods, a container structure suitable for carrying goods is provided on the chassis 10, so that the electric vehicle 1 can meet the freighting needs of fully automation, high efficiency, high accuracy, low cost and high safety.

Figure 7:
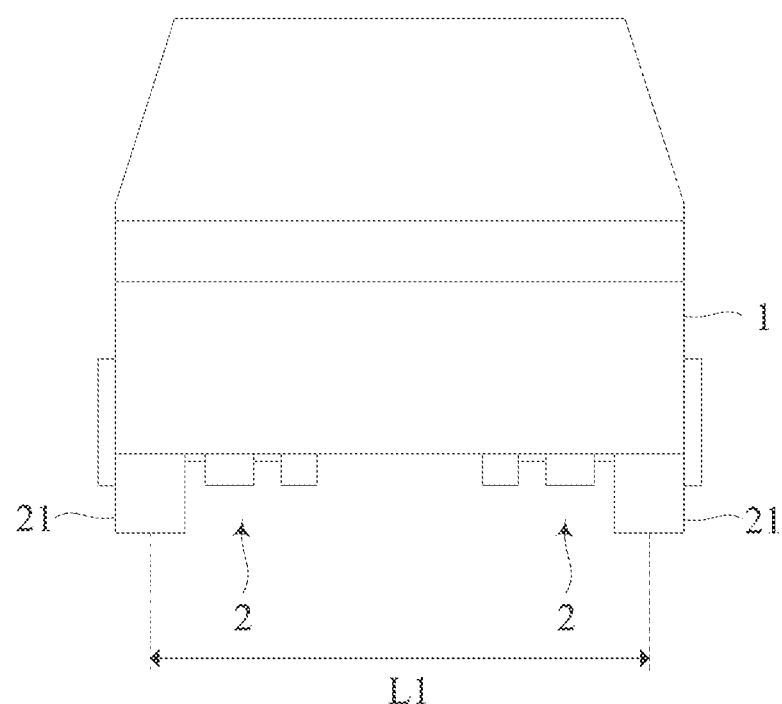
FIG. 7 to FIG. 9 are schematic views showing changes of track width of the electric vehicle carrying passengers, during straight driving process, according to an embodiment of the present disclosure.
Figure 8:
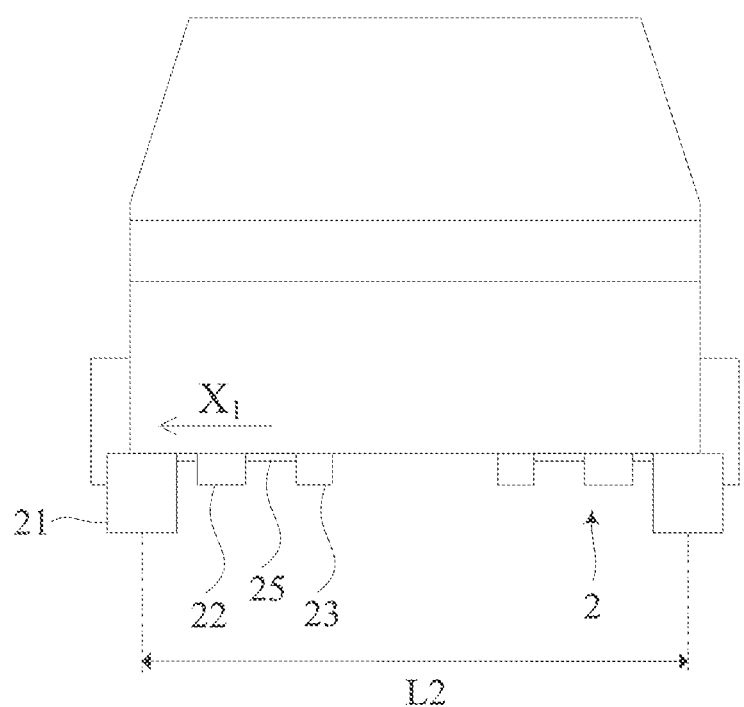
Figure 9:
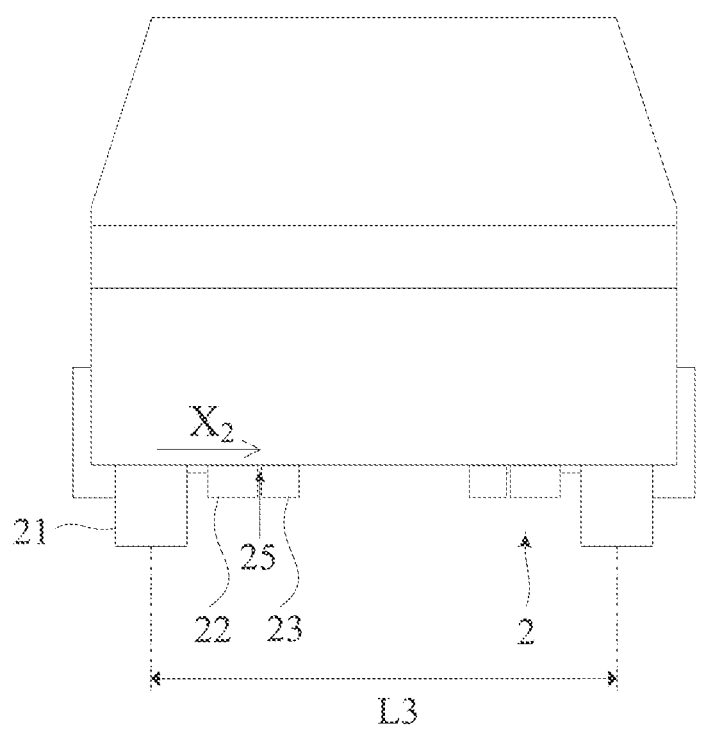

For example, FIG. 7 to FIG. 9 show changes of track width of the electric vehicle used for carrying passengers during straight running process in embodiments, wherein FIG. 7 shows a structure of the vehicle having a normal track width, FIG. 8 shows a structure of the vehicle having an increased track width, and FIG. 9 shows a structure of the vehicle having a reduced track width. As shown in FIG. 7, when the electric vehicle 1 runs straight at a normal speed, the track width between the wheels 21 of every two wheel assemblies 2, including the front track width and the rear track width, maintains the normal track width L1. When the electric vehicle 1 runs at a high speed, the electric vehicle 1 will be rolled over due to centrifugal force if the track width is too small, therefore, the wheel 21 is driven to extend outward by the displacement device 23 of each of the wheel assemblies 2, to increase the track width and improve vehicle stability. Referring to FIG. 8, the driving device 22 and the wheel 21 are driven to move in the direction "$X_1$" away from the center of the electric vehicle 1, along the width direction "X" of the vehicle body, by the displacement device 23 and through the telescopic shaft 25 of each of the wheel assemblies 2. Therefore, the wheel 21 is extended outward to increase the track width to L2. When the electric vehicle 1 runs at a low speed or stops, the wheel 21 can be driven to retract inward by the displacement device 23, thereby the track width will be reduced to save energy consumption at low speeds, and occupied area of the wheels 21 will be reduced to facilitate parking. Referring to FIG. 9, the driving device 22 and the wheel 21 are driven to move in the direction "$X_2$" towards the center of the electric vehicle 1, along the width direction "X" of the vehicle body, by the displacement device 23 and through the telescopic shaft 25 of each of the wheel assemblies 2. Therefore, the wheel 21 is retracted inward to decrease the track width to L3. Wherein, L2>L1>L3, and a specific degree of extension and retraction of the wheel 21 depends on parameters including the configuration of the electric vehicle 1 and the size of the wheel 21. For example, under normal conditions, the wheel 21 can extend up to 1 m outwards and retract at least 50 cm inwards, but not limited to this. The degree of extension and retraction of the wheel 21 can also be configured by the user according to needs, which is not limited in the present disclosure. In addition, the above-mentioned normal speed, high speed, and low speed are also determined according to the configuration of the electric vehicle 1, e.g., the normal speed is between 30 km/h to 100 km/h, the low speed is less than 30 km/h, and the high speed is greater than 100 km/h. The user can also configure the values as needed, for example, the running speed is configured into multiple stages, and every 5 km is a stage, which is not limited in the present disclosure.

Of course, the electric vehicle 1 has other driving conditions, which will be described in detail below in conjunction with the automatic driving method.

Figure 10:
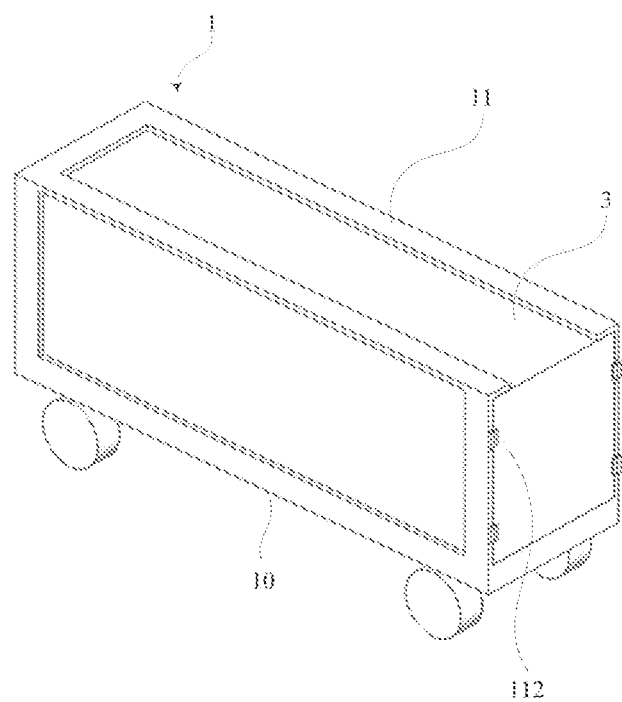
FIG. 10 is a schematic view of the electric vehicle carrying goods according to an embodiment of the present disclosure.
Figure 11:
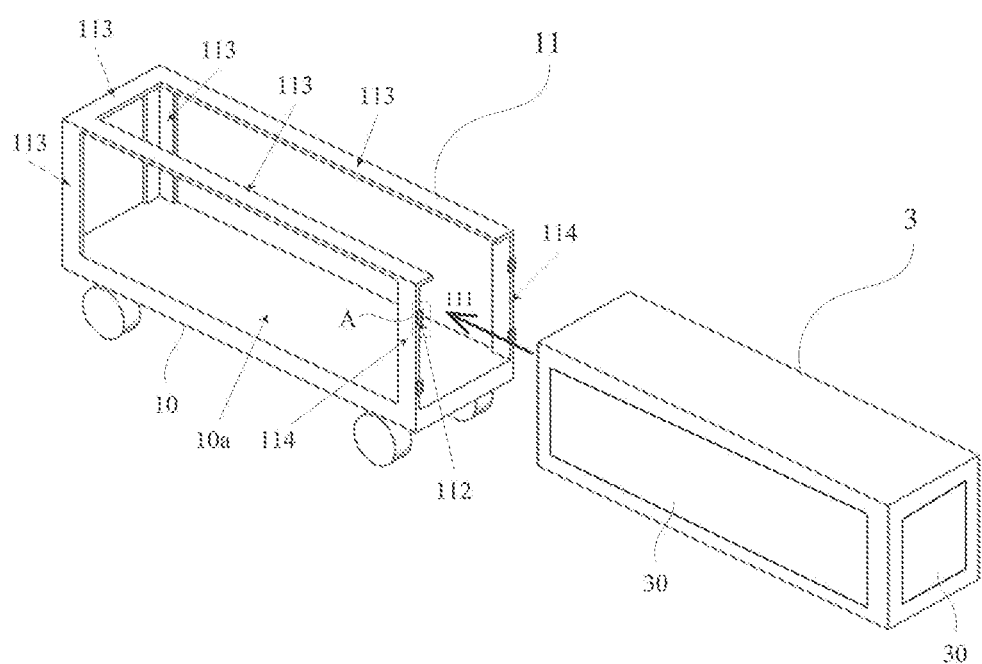
FIG. 11 is a schematic view of the electric vehicle shown in FIG. 10 separated from a freight container.

FIG. 10 shows a structure of the electric vehicle for carrying goods in an embodiment, and FIG. 11 shows a structure of the electric vehicle separated from a freight container. Referring to FIG. 10 and FIG. 11, the electric vehicle 1 in this embodiment further includes: a fixing frame 11 provided on a carrying surface 10a of the electric vehicle 1, the carrying surface 10a is located on the upper surface of the chassis 10, the fixing frame 11 is provided with a sliding channel 111 and a switch 112 that controls at least the sliding channel 111; a freight container 3 capable of being pushed into the fixing frame 11 through the sliding channel 111, wherein when the freight container 3 is pushed into the fixing frame 11, the switch 112 at least partially closes the sliding channel 111 and the freight container 3 is fixed to the carrying surface 10a.

The fixing frame 11 includes a plurality of right-angle plates 113 connected with each other and side plates 114 that provide sliding channel 111. For example, in FIG. 11, five right-angle plates 113 and two side plates 114 are shown. The freight container 3 is pushed into the fixing frame 11 from the side plate 114, and part of side edges of the freight container 3 is embedded in inner walls of the right-angle plates 113. Part of side edges of the freight container 3 at the side plate 114 is limited and fixed by the switch 112. Therefore, the freight container 3 can be stably embedded in the fixing frame 11 and move with the electric vehicle 1. One or more sides of the freight container 3, e.g., two sides shown in FIG. 11 can be equipped with electronic display screens 30, which is used to display mobile advertisement, so that the freight container 3 becomes a movable billboard.

Figure 12:
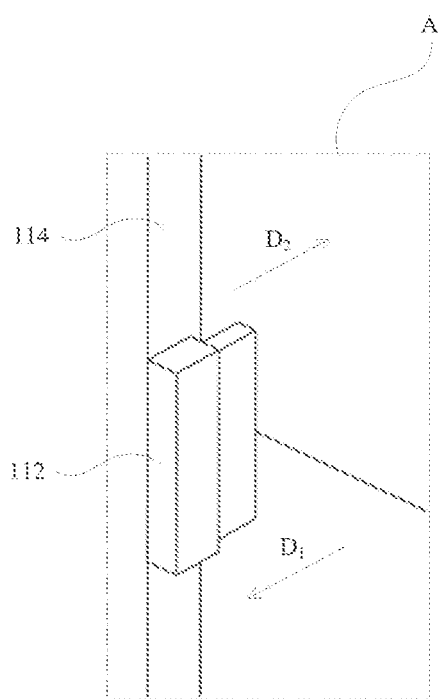
FIG. 12 is an enlarged view of an area A in FIG. 11.

FIG. 12 shows an enlarged structure of the area A in FIG. 11, specifically a structure of the switch 112. The switch 112 may be an electronically controlled switch or a telescopic switch provided on the side plate 114. Referring FIG. 10 to FIG. 12, in a first state when the electric vehicle 1 is not loaded with the freight container 3, the switch 112 can move in a first direction "$D_1$" shown in FIG. 12, under a first control signal, thereby the sliding passage 111 for pushing the freight container 3 into the fixing frame 11 is provided between the side plates 114. When the freight container 3 is completely pushed into the fixing frame 11, the switch 112 can move in a second direction "$D_2$" shown in FIG. 12, under a second control signal, to partially close the sliding channel 111 and fix the freight container 3. On each side plate 114, one or more switches 112 may be provided as needed. The first control signal and the second control signal for controlling the switch 112 may be provided by a control cluster, and contents of the control cluster will be described in detail below in conjunction with the automatic freighting method.

Figure 13:
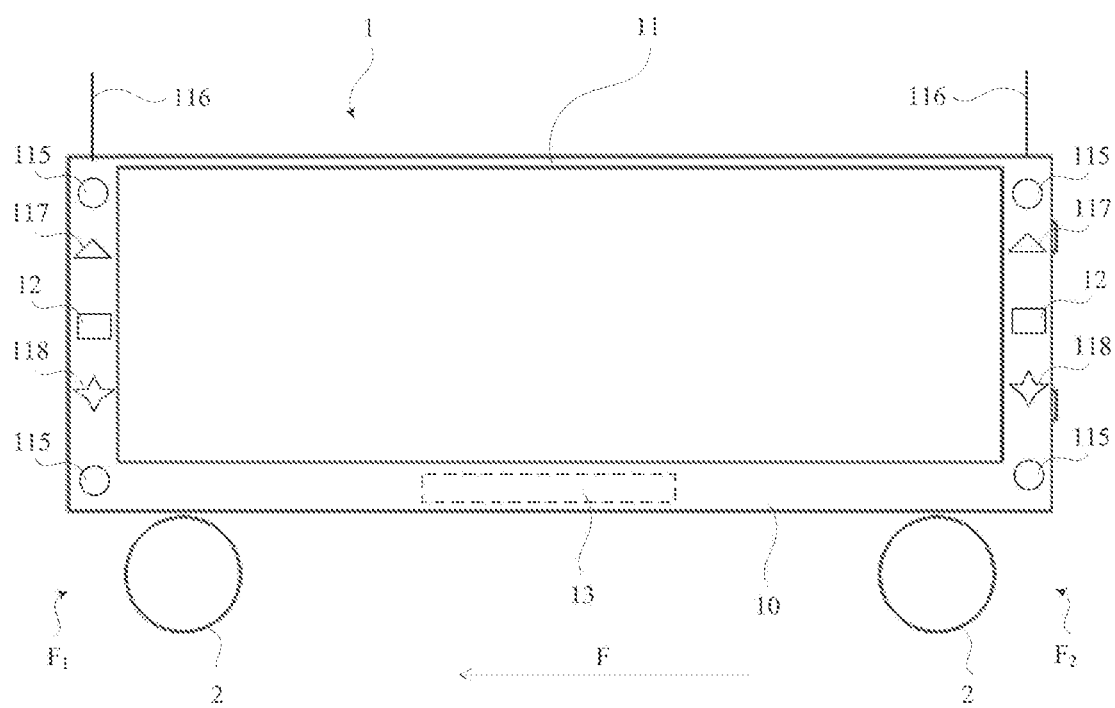
FIG. 13 is a side view of the electric vehicle carrying goods according to an embodiment of the present disclosure.

FIG. 13 shows a side structure of the electric vehicle for carrying goods in the embodiment. As shown in FIG. 13, the fixing frame 11 of the electric vehicle 1 is provided with a plurality of rotatable cameras 115 for detecting surroundings and aerials 116 for the camera 115 to communicate with the electric vehicle 1; wherein, the cameras 115 are provided at least on a front end $F_1$, a rear end $F_2$, and one or more sides of the electric vehicle 1 along a forward direction F, and the aerials 116 are provided on the top of the fixing frame 11. The electric vehicle 1 has an automatic driving function, and the electric vehicle 1 can be automatic driven based on the surroundings detected by the cameras 115. In some embodiments, the cameras 115 are respectively disposed at four corners of the electric vehicle 1 to assist the automatic driving of the electric vehicle 1. The fixing frame 11 is also provided with one or more scanners 12 for the user to scan corresponding pickup code and mailing code when picking up and mailing goods. There are one or more talkers 117 provided on the fixing frame 11. The talker 117 has a call button. When the call button is pressed, target user or sender can talk to the control cluster through the talker 117, thereby solving doubts of the target user and the sender during automatic pickup process and automatic sending process. There are one or more alarms 118 provided on the fixing frame 11. When the electric vehicle 1 is damaged or other emergency occurs, the alarm 118 may notify the control cluster and emit alarm sounds. In some cases, passers-by may also notify emergency situation of the electric vehicle 1 to the control cluster through the talker 117. The control cluster can also obtain the information of the surroundings of the electric vehicle 1 through the cameras 115 at any time. The scanners 12, the talkers 117 and the alarms 118 can be provided at the four corners of the fixing frame 11 for the convenience of users, and scanning function, call function and alarm function of the electric vehicle 1 will not be affected by damage of some of the scanners 12, some of the talkers 117 and some of the alarms 118. In some embodiments, the scanners 12, the talkers 117, and the alarms 118 may also be provided on the freight container.

Further, the chassis 10 of the electric vehicle 1 is provided with a battery slot 13, and battery pack of the electric vehicle 1 is detachably installed in the battery slot 13. The battery pack can be flexibly inserted into and removed from the battery slot 13. In this way, when the electric vehicle 1 runs out of power, the battery pack can be quickly replaced, so that the electric vehicle 1 maintains long-lasting battery life. Or when the electric vehicle 1 returns to a distribution center and the freight container is unloaded, the electric vehicle 1 can be replaced with a new fully charged battery pack and then performs a next distribution.

Figure 14:
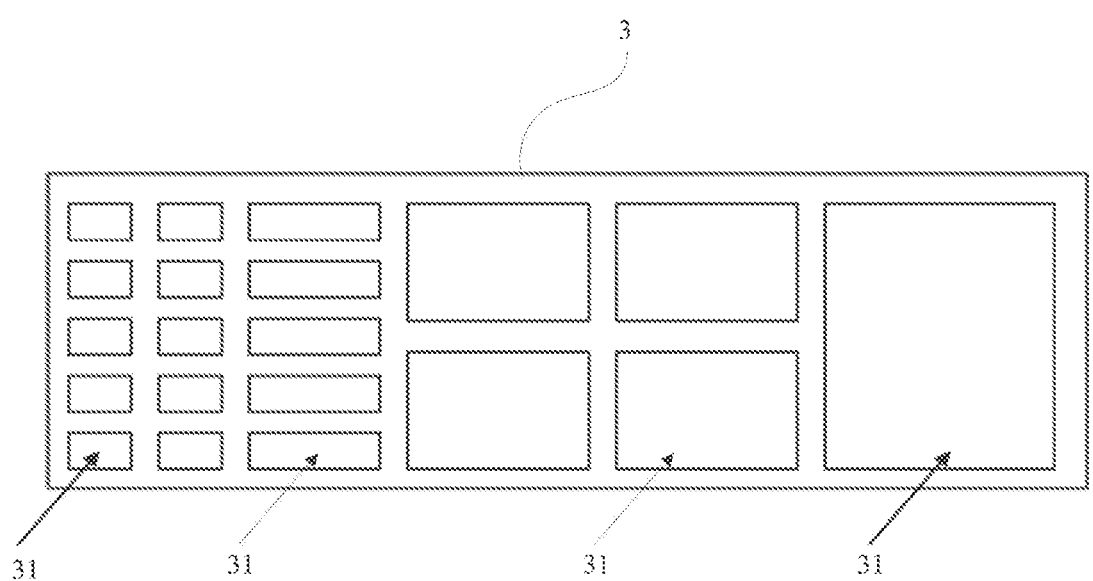
FIG. 14 is a schematic view showing the freight container having a plurality of storage compartments according to an embodiment of the present disclosure.

FIG. 14 shows a structure of the freight container having multiple storage compartments in the embodiment. Referring to FIG. 14, a plurality of interchangeable storage compartments 31 of different capacities are provided in the freight container 3, e.g., four storage compartments 31 of different capacities are shown in FIG. 14, so that the freight container 3 can be adapted to different storage requirements of goods in different sizes. Each storage compartment 31 is capable of storing a piece of goods through a turnover box. The storage compartment 31 is replaceable, so that the freight container 3 has combinations of storage compartments 31 with different capacities, thereby adapting to the size of the goods and making full use of an internal space of the freight container. The freight container is provided with a first memory (not specifically shown in FIG. 14), the first memory stores user information and storage path of each piece of goods. The user information indicates a target user and a destination address of the piece of the goods, and the storage path indicates the storage compartment and the turnover box storing the piece of the goods. Some storage compartments 31 may also have a heat preservation function and an alarm function to detect whether a door of the storage compartments 31 is closed.

In some embodiments, the storage path of each piece of the goods is generated according to a first identification code of the freight container, a second identification code of the storage compartment corresponding to the piece of the goods, and a third identification code of the turnover box corresponding to the piece of the goods. Each freight container has a first identification code, each storage compartment in the freight container has a second identification code, and the turnover box in each storage compartment has a third identification code. The storage path of each piece of the goods generated according to the first identification code of the freight container, the second identification code of the storage compartment corresponding to the piece of the goods, and the third identification code of the turnover box corresponding to the piece of the goods, makes each piece of the goods uniquely correspond to a turnover box in a storage compartment of a freight container.

Wherein, the user information of the goods is transported along with the goods. For example, a label is attached to each piece of the goods, and the label stores the user information corresponding to the piece of the goods. The user information can be stored in an encrypted manner as long as it can be read by a computer of the control cluster. Encrypted storage can improve confidentiality of information and prevent leakage of the user information. The storage path of the goods is generated in stages according to transportation status of the goods. The transportation status of the goods includes at least: the goods being loaded into the turnover boxes and the goods together with the turnover boxes being loaded into the storage compartment of the freight container. Firstly, when the goods are loaded into the turnover boxes, temporary storage paths are generated according to the third identification codes of the turnover boxes, such as "a first piece of the goods: a first turnover box". Secondly, when the goods together with the turnover boxes are loaded into the storage compartments of the freight container, complete storage paths are generated according to the third identification codes of the turnover boxes, the second identification codes of the storage compartments and the first identification code of the freight container, such as "the first piece of the goods: a first freight container→a first storage compartment→the first turnover box". Finally, the storage path and the user information of each piece of the goods are stored in the first storage of the freight container. Thus, the first storage obtains the user information and storage path of each piece of the goods.

In some embodiments, the switch is a split type switch. The split switch includes a first switch contact provided on the freight container and a second switch contact provided on the fixing frame; when the freight container is pushed into the fixing frame, the split type switch is switched on and the first memory exchanges data with the electric vehicle. Specifically, the first memory exchanges data with the electric vehicle through the control cluster. When the freight container is pushed into the fixing frame to complete assembly, the first switch contact contacts with the second switch contact, therefore, the split switch is switched on and generates an electrical signal transmitted to the control cluster. The electric signal carries a fourth identification code of the electric vehicle and the first identification code of the freight container. After receiving the electric signal, the control cluster will know that the electric vehicle and the freight container are assembled, and then obtain the user information and the storage path of each piece of the goods stored in the first memory associated with the first identification code, and further generate distribution information according to the user information and the storage path of each piece of the goods stored in the first memory, the distribution route then will be transmitted to the electric vehicle associated with the fourth identification code. The electric vehicle includes a control module, and the electric vehicle can automatically distribute the goods in the freight container when the control module receives the distribution information.

The embodiment of the present disclosure also provides an automatic driving method of the electric vehicle, which is applied on the electric vehicle described in any of the above embodiments. The automatic driving method of the present disclosure can be executed by the control module of the electric vehicle, the control module is a function module configured in the electric vehicle with automatic driving function. The present disclosure adds the following steps to the control module but not changes basic control principle of the control module. The control module can communicate with a navigation system and an automatic driving system to realize the automatic driving of the electric vehicle.

Figure 15:
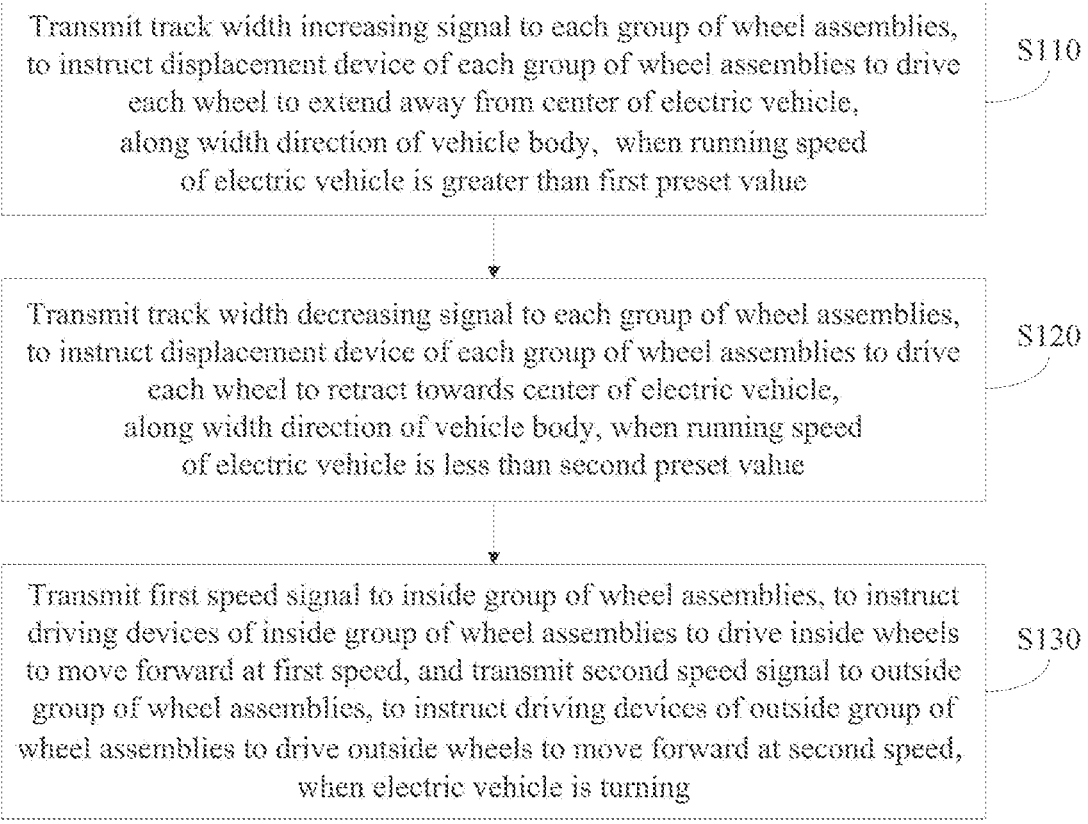
FIG. 15 is a flow chart showing an automatic driving method of the electric vehicle according to an embodiment of the present disclosure.

FIG. 15 shows main steps of the automatic driving method of the electric vehicle in the embodiment. Referring to FIG. 15, the automatic driving method of the electric vehicle in this embodiment mainly includes the following steps S110, S120 and S130. In step S110, a track width increasing signal is transmitted to each of the wheel assemblies, when a running speed of the electric vehicle is greater than a first preset value, so that the displacement device of each of the wheel assemblies drives the wheel to extend away from the center of the electric vehicle and along the width direction of the vehicle body. Referring to a structure of increased track width of the electric vehicle shown in FIG. 8, in response to the track width increasing signal, the displacement device drives the driving device and the wheel to move away from the center of the electric vehicle, along the width direction of the vehicle body, through the telescopic shaft, thereby the wheel is extended and the track width is increased.

In step S120, a track width decreasing signal is transmitted to each of the wheel assemblies, when the running speed of the electric vehicle is less than a second preset value, so that the displacement device of each of the wheel assemblies drives the wheel to retract towards the center of the electric vehicle, along the width direction of the vehicle body. Referring to a structure of decreased track width of the electric vehicle shown in FIG. 9, in response to the track width decreasing signal, the displacement device drives the driving device and the wheel to move towards the center of the electric vehicle, along the width direction of the vehicle body, through the telescopic shaft, thereby the wheel is retracted and the track width is decreased.

Wherein, the first preset value is much larger than the second preset value. Further, when the running speed of the electric vehicle is between the first preset value and the second preset value, the control module can also transmit a track width adjusting signal to each of the wheel assemblies according to the running speed, instructing the displacement device to adjust the track width in real time, based on the running speed. Therefore, the track width is adapted to the running speed and the best driving experience is obtained.

In step S130, when the electric vehicle is turning, a first speed signal is transmitted to inside group of the wheel assemblies, instructing the driving devices of the inside group of the wheel assemblies to drive inside wheels to run forward at a first speed, and a second speed signal is transmitted to outside group of the wheel assemblies, instructing the driving devices of the outside group of the wheel assemblies to drive outside wheels to run forward at a second speed. Wherein, the second speed is greater than the first speed.

Figure 16:
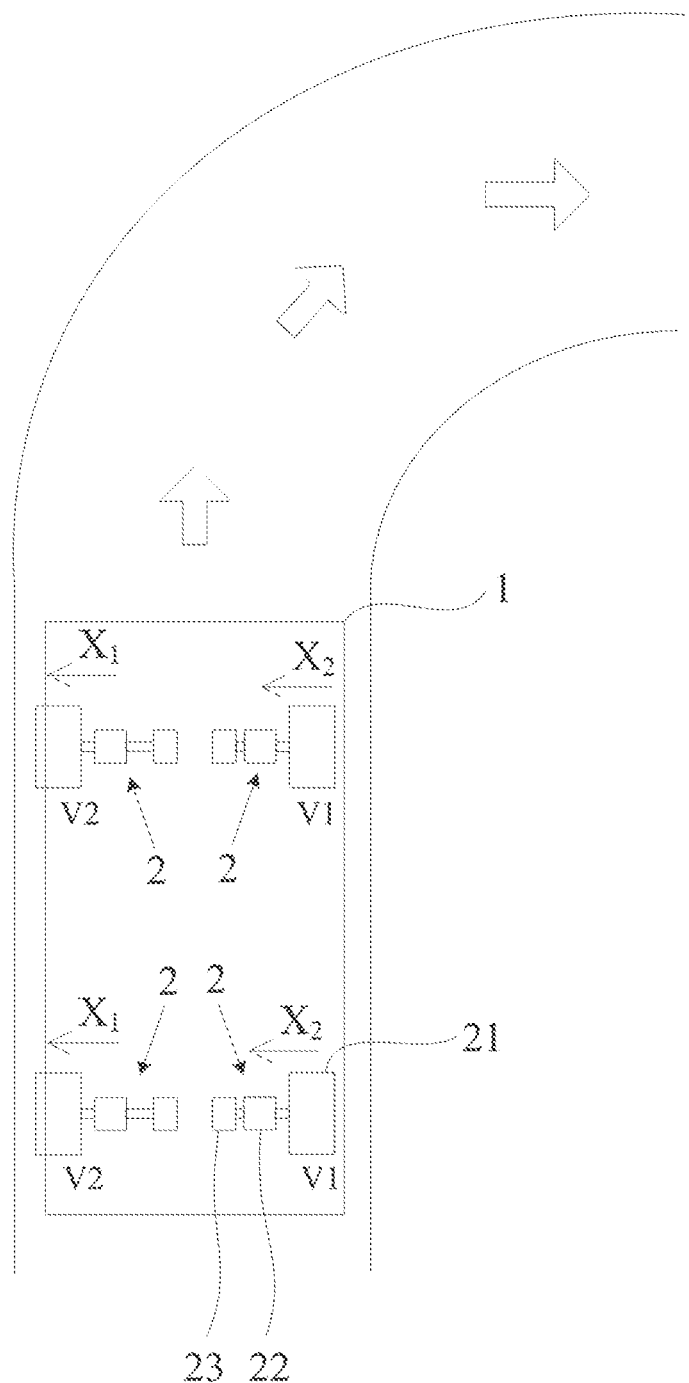
FIG. 16 is a top view showing the electric vehicle turning according to an embodiment of the present disclosure.

FIG. 16 is a top view structure showing the electric vehicle turning in the embodiment. Referring to FIG. 16, when the electric vehicle 1 turns, the wheels 21 maintain running forward without turning, which increases the stability of the electric vehicle 1 when turning. Turning of the electric vehicle 1 is achieved based on the speed difference between the inside wheel 21 and the outside wheel 21, driven by the driving device 22 of each of the wheel assemblies 2. Taking a right turn shown in FIG. 16 as an example, the driving devices 22 of inside group, i.e., two right-side wheel assemblies 2 drive two right-side wheels 21 to run at a first speed V1, and the driving devices 22 of outside group, i.e., two left-side wheel assemblies 2 drive two left-side wheels 21 to run at a second speed V2, wherein V1<V2. Since the speed V1 of the right-side wheel 21 is smaller than the speed V2 of the left-side wheel 21, the electric vehicle 1 turns right under the action of the speed difference between the left-side and right-side wheels. The speed difference will be large when a turning angle is large, the speed difference will be small when the turning angle is small, and specific speed difference is calculated by the control module of the electric vehicle 1, which is not limited in the present disclosure.

It should be noted that the sequence numbers of the steps in the above embodiments are only used to indicate the control mode of the electric vehicle under different driving conditions, and do not limit logical relation and execution order between the steps.

In some embodiments, the automatic driving method of the electric vehicle further includes the following steps: when the electric vehicle is turning, a retracting signal being transmitted to the inside group of the wheel assemblies, which instructs the displacement devices of the inside group of the wheel assemblies to drive the inside wheels to retract towards the center of the electric vehicle, along the width direction of the vehicle body; and, an extending signal being transmitted to the outside group of the wheel assemblies, which instructs the displacement devices of the outside group of the wheel assemblies to drive the outside wheels to extend away from the center of the electric vehicle, along the width direction of the vehicle body.

To assist the electric vehicle in turning, in addition to generating the speed difference between the inside wheel and the outside wheel through the driving device of each of the wheel assemblies, the control module further drives the inside front wheel and the inside rear wheel to retract, or drives the outside front wheel and the outside rear wheel to extend, or simultaneously drives the inside front wheel and the inside rear wheel to retract and the outside front wheel and the outside rear wheel to extend, through the displacement device. Referring to FIG. 16, in order to further assist the electric vehicle in turning, the displacement devices 23 of the inside group, i.e., the two right-side wheel assemblies 2 drive the inside wheels to appropriately retract in the direction "$X_2$" towards the center of the electric vehicle 1, and/or, the displacement devices 23 of the outside group, i.e., the two left-side wheel assemblies 2 drive the outside wheels to appropriately extend in the direction "$X_1$" away from the center of the electric vehicle 1. The specific retraction degree of the inside wheels and the specific extension degree of the outside wheels are calculated by the control module, which is not limited in the present disclosure.

Further, in some embodiments, the automatic driving method of the electric vehicle may further include: when the running speed of the electric vehicle is greater than the first preset value, a height reducing signal being transmitted to each of the wheel assemblies, which instructs the lifting device of each of the wheel assemblies to reduce the ground clearance of the chassis, thereby the center of gravity of the electric vehicle will be reduced and the stability and safety of the electric vehicle at high speeds will be improved. Further, when the electric vehicle is stopping, a height increasing signal is transmitted to each of the wheel assemblies, which instructs the lifting device of each of the wheel assemblies to raise the ground clearance of the chassis, thereby height of the vehicle body will be restored to a height that facilitates getting on and off the electric vehicle for the passengers. In some embodiments, based on the control signal of the control module of the electric vehicle, the lifting device can adjust the ground clearance of the chassis in real time according to the running speed. The higher the running speed is, the lower the ground clearance of the chassis will be decreased, therefore the center of gravity of the electric vehicle will be reduced and driving safety and stability will be improved; when the running speed gradually slows down, the ground clearance of the chassis will be gradually restored to facilitate getting on and off the electric vehicle for the passengers.

The above process of adjusting the wheel speed, the telescoping degree of the wheel, and the ground clearance of the chassis may be a continuous adjustment or a phase adjustment, which depends on the configuration of the control module, and is not limited in the present disclosure. For example, in some embodiments, the running speed of the electric vehicle may be configured to multiple preset values to adjust the wheel of each of the wheel assemblies and the ground clearance of the chassis in phases.

In some embodiments, driving parameters of the electric vehicle may be adjusted in real time according to driving conditions of the electric vehicle. Wherein, the driving conditions of the electric vehicle can be obtained by the control module of the electric vehicle, according to the surroundings information collected by the cameras and combined with the navigation system and the automatic driving system.

FIG. 17 shows main steps of another automatic driving method in the embodiment. Referring to FIG. 17, the automatic driving method of the electric vehicle in this embodiment includes the following steps S210, S220 and S230. In step S210, when the electric vehicle is running straight, the wheels are controlled to rotate at a same speed by the driving devices, the track width along the width direction of the vehicle body is controlled to be increased as the running speed increases by the displacement devices, and the ground clearance of the chassis is controlled to be reduced as the running speed increases by the lifting devices of the plurality of the wheel assemblies; wherein each of the wheel assemblies is connected to the chassis through the lifting device. In step S220, when the electric vehicle is turning, the speed of the outside wheels are controlled to be greater than the speed of the inside wheels by the driving devices, the outside wheels are controlled to move outward, relative to the inside wheels, along the width direction of the vehicle body, by the displacement devices, and ground clearance of outside part of the chassis is controlled to be greater than ground clearance of inside part of the chassis by the lifting devices. In step S230, when the electric vehicle passes a slope, ground clearance of a part of the chassis located upstream of the slop is controlled to be less than ground clearance of a part of the chassis located downstream of the slop by the lifting devices, to reduce a gradient of the electric vehicle.

Figure 18:
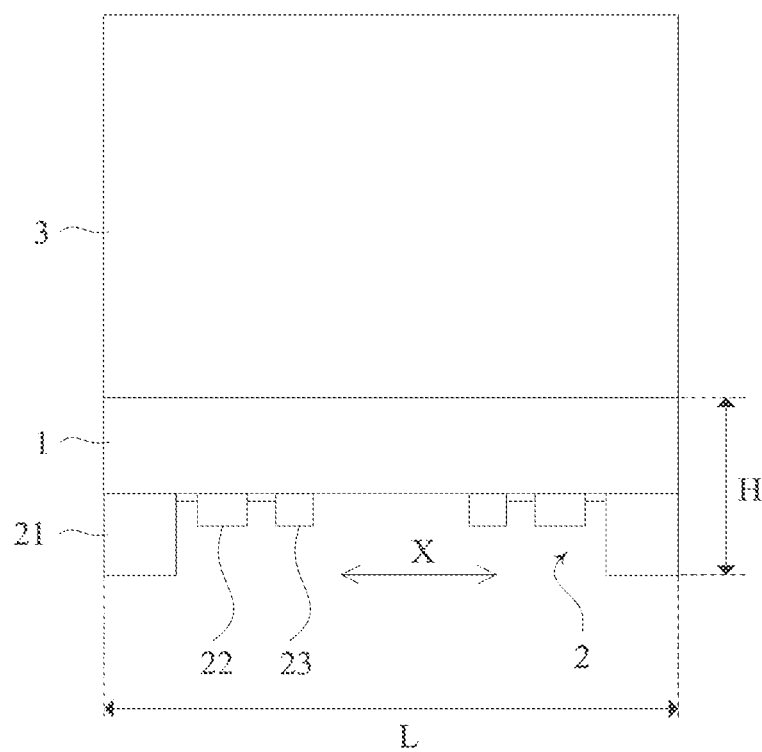
FIG. 18 is a front view showing the electric vehicle carrying goods in a straight driving condition according to an embodiment of the present disclosure.

FIG. 18 shows a front view structure of the electric vehicle under the straight running condition in an embodiment, the electric vehicle in this embodiment is, for example, an electric vehicle carrying goods. As shown in FIG. 18, when the electric vehicle 1 is running straight, the wheels 21 of each of the wheel assemblies 2 are respectively controlled by the driving devices 22 to have a same speed, which ensures stable running of the electric vehicle 1 carrying the freight container 3. When the running speed of the electric vehicle 1 exceeds a certain threshold, the electric vehicle will be rolled over due to the centrifugal force, therefore, the displacement device 23 of each of the wheel assemblies 2 drives the wheel 21 to extend outward in the width direction "X" of the vehicle body, to increase the track width "L" and improve the stability of electric vehicle. When the running speed of the electric vehicle 1 is less than a certain threshold, the displacement device 23 will drive the wheel 21 to retract inward in the width direction "X" of the vehicle body, to reduce the track width "L" and save energy consumption at low speeds, and further to reduce the occupied area of the wheels 21 and be convenient for passing through narrow passages. Further, as the running speed increases, the ground clearance "H" of the chassis of the electric vehicle 1 is lowered by the lifting devices, which reduces the center of gravity of the electric vehicle 1 and improves the stability and safety of the electric vehicle 1 when running at high speeds. When the electric vehicle 1 is parking, the ground clearance "H" of the chassis of the electric vehicle 1 is raised by the lifting devices, so that the goods in the freight container 3 can be easily picked up.

Figure 19:
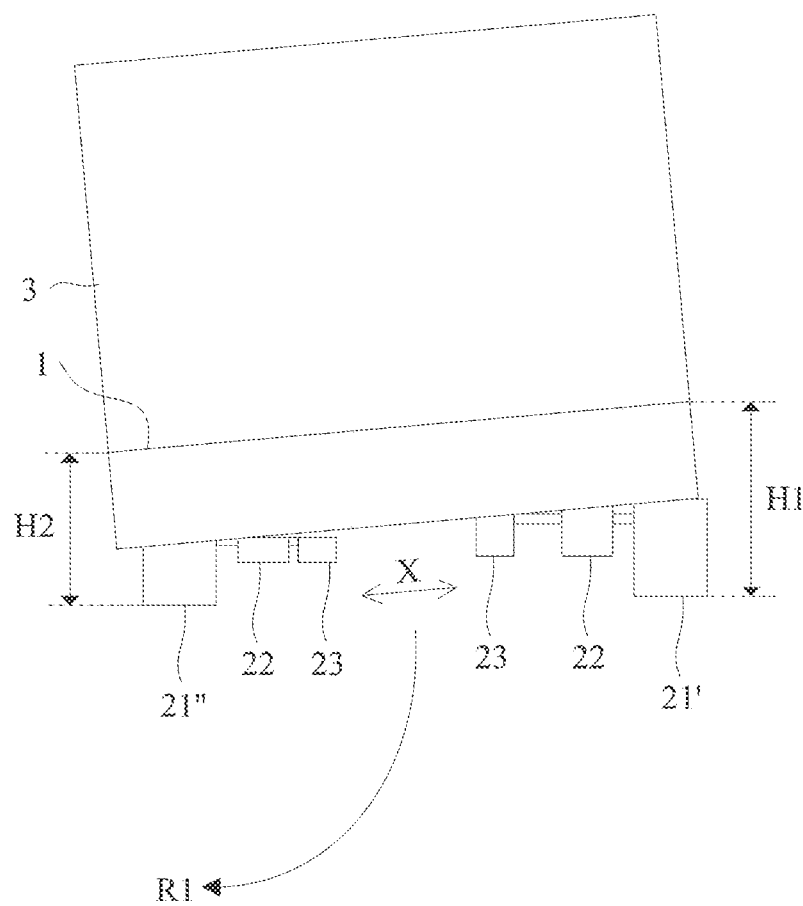
FIG. 19 is a front view showing the electric vehicle carrying goods in a left-turning condition according to an embodiment of the present disclosure.

FIG. 19 shows a front view structure of the electric vehicle for carrying goods under a left-turning condition in the embodiment. Referring to FIG. 19, when the electric vehicle 1 loaded with the freight container 3 is turning left along an arrow "R1", the speed of the outside wheels 21' is controlled to be greater than the speed of the inside wheels 21", by the driving devices 22, therefore a speed difference is generated between the inside wheels 21" and the outside wheels 21' to achieve turning. Both the inside wheels 21" and the outside wheels 21' maintain running forward without turning, which increases the stability of the electric vehicle 1 when turning. Further, in order to assist turning, the displacement devices 23 control the outside wheels 21' to move outward, in the width direction "X" of the vehicle body, relative to the inside wheels 21", to make the turning process smoother. For example, the outside wheels 21' are driven to move outward in the width direction "X" of the vehicle body, or the inside wheels 21" are driven to move inward in the width direction "X" of the vehicle body, or the outside wheels 21' are driven to move outward in the width direction "X" of the vehicle body and at the same time the inside wheels 21" are driven to move inward in the width direction "X" of the vehicle body, to assist turning. During the turning process, the outside ground clearance H1 of the chassis can be controlled to be greater than the inside ground clearance H2 of the chassis, by the lifting devices, to further assist the turning. Specifically, the outside ground clearance H1 of the chassis can be increased by the outside lifting devices, or the inside ground clearance H2 of the chassis can be reduced by the inside lifting devices, or the outside ground clearance H1 of the chassis is increased by the outside lifting devices and at the same time the inside ground clearance H2 of the chassis is reduced by the inside lifting devices, so that the electric vehicle 1 carrying the freight container 3 leans slightly to the turning side, to assist the turning. Of course, a leaning degree of the electric vehicle 1 should be controlled within a certain safety range to ensure that the electric vehicle 1 keeps stable when turning.

Figure 20:
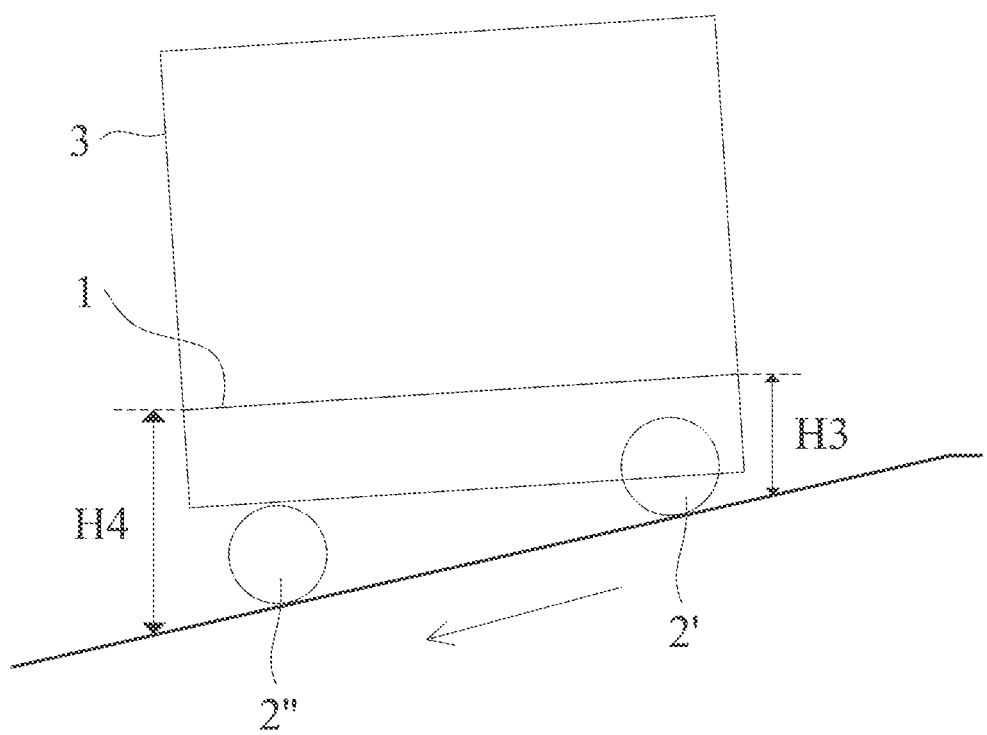
FIG. 20 is a side view showing the electric vehicle carrying goods in a downhill condition according to an embodiment of the present disclosure.

FIG. 20 shows a side view structure of the electric vehicle for carrying goods under a downhill condition in the embodiment. Referring to FIG. 20, when the electric vehicle 1 carrying the freight container 3 goes downhill, the ground clearance H3 of the chassis located upstream of the slop is controlled to be less than the ground clearance H4 of the chassis located downstream of the slop, by the lifting devices, to reduce a gradient of the electric vehicle 1 and keep the electric vehicle 1 and the freight container 3 stable when passing the slope. For example, the ground clearance H3 of the chassis part located upstream of the slop can be lowered by the lifting devices of the wheel assemblies 2' located upstream of the slope, or the ground clearance H4 of the chassis part located downstream of the slop can be raised by the lifting devices of the wheel assemblies 2" located downstream of the slope, or the ground clearance H3 of the chassis part located upstream of the slop is lowered by the lifting devices of the wheel assemblies 2' located upstream of the slope and at the same time the ground clearance H4 of the chassis part located downstream of the slop is raised by the lifting devices of the wheel assemblies 2" located downstream of the slope. Therefore, the ground clearance H3 of the chassis part located upstream of the slop is lower than the ground clearance H4 of the chassis part located downstream of the slop, and the gradient of the electric vehicle 1 is reduced, so that the electric vehicle 1 is running smoothly on the slope. The lifting device can be connected to the chassis of the electric vehicle 1 through a shock-absorbing mechanism, so as to smoothly adjust the ground clearance of the chassis.

When the electric vehicle carrying the freight container goes uphill, the ground clearance of the chassis part located upstream of the slop will also be controlled to be lower than the ground clearance of the chassis part located downstream of the slop, by the lifting devices, to reduce the gradient of the automatic electric vehicle.

In the above-mentioned automatic driving method, the driving device, the displacement device and the lifting device in each of the wheel assemblies independently control the wheel to increase the flexibility of the electric vehicle and be adapted to different conditions. When the electric vehicle runs at a high speed, the track width is increased by the displacement devices to improve stability and safety; when the electric vehicle runs at a low speed, the track width is decreased by the displacement devices to save energy consumption. When the electric vehicle is turning, a speed difference between the inside wheels and the outside wheels is generated by the driving devices to achieve turning. In addition, the ground clearance of the chassis is adjusted by the lifting devices to further enhance the safety, the stability and the mobility of the electric vehicle.

In some embodiments, when each of the wheel assemblies includes at least two tires arranged in the width direction of the vehicle body, the tires in a same wheel assembly are driven by the driving device, jointly, to have a same speed; while each tire in the same wheel assembly is driven by the displacement device, separately, to extend and retract independently along the width direction of the vehicle body.

The automatic driving method of the electric vehicle further includes: when the electric vehicle passes a hollow, a track width along the width direction of the vehicle body between the tires of a same wheel assembly located in the hollow increased, to avoid the hollow, by the displacement device of the wheel assembly located in the hollow. The way to increase the track width along the width direction of the vehicle body between the tires of the same wheel assembly located in the hollow may be, driving an outside tire of the wheel assembly located in the hollow to extend outwards in the width direction of the vehicle body, or driving an inside tire of the wheel assembly located in the hollow to retract inwards in the width direction of the vehicle body, or simultaneously driving the outside tire of the wheel assembly located in the hollow to extend outwards in the width direction of the vehicle body and driving the inside tire to retract inwards in the width direction of the vehicle body, thereby to increase the track width between the tires of the same wheel assembly located in the hollow and avoid the hollow. Or, when the electric vehicle passes the hollow, the tires of the same wheel assembly located in the hollow are driven to extend or retract in the width direction of the vehicle body, to avoid the hollow, by the displacement device of the wheel assembly located in the hollow. That is, in addition to increase the track width between the tires of the wheel assembly located in the hollow to avoid the hollow, all tires of the wheel assembly located in the hollow can also be moved in the width direction of the vehicle body to avoid the hollow.

The embodiment of the present disclosure also provides an electronic device, including a processor and a memory storing executable instructions executed by the processor, and the processor is configured to execute the steps of the automatic driving method of the electric vehicle described in any of the above embodiments, by executing the executable instructions. The electronic device is configured in the electric vehicle and independently controls the wheel of each of the wheel assemblies through the driving device, the displacement device, and the lifting device, to assist automatic driving and improve the flexibility, the stability, the safety and the comfort of the electric vehicle. The electronic device can communicate with a navigation system (e.g., GPS or BDS) and an automatic driving software, to realize automatic driving of the electric vehicle.

Figure 21:
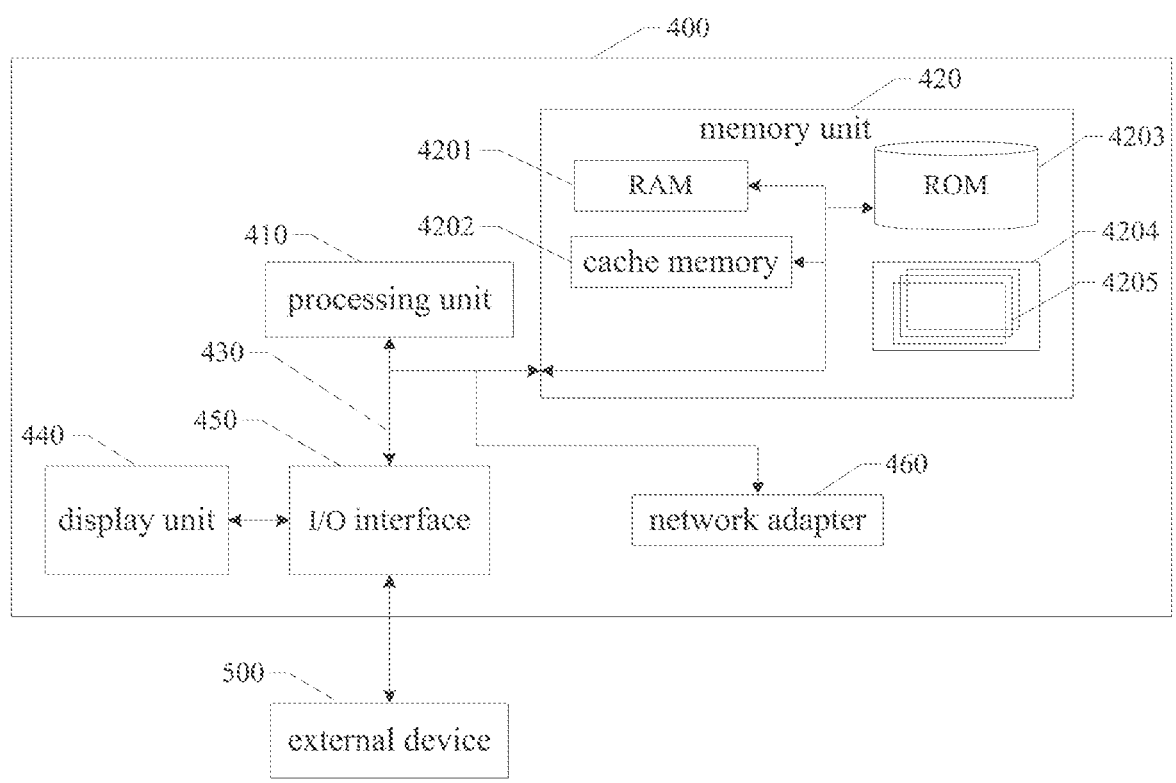
FIG. 21 is a block view of an electronic device according to an embodiment of the present disclosure.

FIG. 21 is a block diagram of an electronic device in an embodiment of the present disclosure, it should be understood that FIG. 21 only schematically shows modules, these modules may be virtual software modules or actual hardware modules, and splitting, merging, and adding of these modules all fall within the protection scope of the present disclosure.

Hereinafter, referring to FIG. 21, an electronic device 400 of the present disclosure will be described. The electronic device 400 shown in FIG. 21 is only an example, which should not constitute any limitation to the function and use scope of the embodiments of the present disclosure.

As shown in FIG. 21, the electronic device 400 is represented in a form of a general computing device. Components of the electronic device 400 may include, but is not limited to: at least one processing unit 410, at least one memory unit 420, a bus 430 connecting different system components (including the memory unit 420 and the processing unit 410), and a display unit 440, etc.

Wherein, the memory unit stores program codes which may be executed by the processing unit 410, causing the processing unit 410 to execute the steps of the automatic driving method described in any of the above embodiments.

The memory unit 420 may include a readable medium in a form of a volatile memory unit, e.g. a random-access memory unit (RAM) 4201 and/or a cache memory unit 4202, and may further include a read-only memory unit (ROM) 4203.

The memory unit 420 may further include a program/practical tool 4204 having a set (at least one) of program modules 4205. Such program modules 4205 include, but are not limited to: an operating system, one or more application programs, other program modules and program data, wherein each or a certain combination in these examples may include implementation of a network environment.

The bus 430 may represent one or more of several bus structures, including a memory unit bus or a memory unit controller, a peripheral bus, a graphical acceleration port, a processing unit, or a local area bus using any bus structure in a plurality of bus structures.

The electronic device 400 may also communicate with one or more external devices 500 (e.g., a keyboard, a pointing device, a Bluetooth device, etc.), and communicate with one or more devices enabling users to interact with the electronic device 400, and/or communicate with any device (e.g., a router, a modem, etc.) enabling the electronic device 400 to communicate with one or more other computing devices. Such communication may be performed through an input/output (I/O) interface 450. Moreover, the electronic device 400 may further communicate with one or more networks (e.g., a local area network (LAN), a wide area network (WAN), and/or a public network, e.g., the Internet) through a network adapter 460. The network adapter 460 may communicate with other modules of the electronic device 400 through the bus 430. It should be understood that although not shown in the figure, other hardware and/or software modules may be used in conjunction with the electronic device 400, including, but not limited to, microcode, an device driver, a redundancy processing unit, an external disk driving array, an RAID system, a tape driver, and a data backup memory system, etc.

The embodiment of the present disclosure also provides an automatic freighting system including multiple electric vehicles. The electric vehicle referred to in this embodiment is the electric vehicle used for carrying goods described in any of the above embodiments. The electric vehicle can communicate with the control cluster to realize automatic freighting under control of the control cluster.

The automatic freighting system also includes a distribution center equipped with two freight channels, i.e., an inward freight channel and an outward freight channel. The inward freight channel is used to distribute goods transferred from other distribution centers to destinations; and the outward freight channel is used to transfer goods received to other distribution centers. The distribution center can be set up according to freight volume. For example, for a city with a small freight volume, a distribution center can be set up in the city; while for a city with a large freight volume, multiple distribution centers can be set up in different areas of the city.

The distribution center is equipped with automatic device for automatic loading and unloading and automatic transporting. The automatic device is, for example, a belt conveyor with a movable robot arm and an automatic scanner. The automatic device can automatically load the goods into the turnover boxes, take out the goods from the turnover boxes, load the turnover boxes together with the goods into the storage compartments of the freight container, take out the turnover boxes together with the goods from the storage compartments of the freight container, load the freight container onto the electric vehicle, and unload the freight container from the electric vehicle. The automatic device can connect the inward freight channel and the outward freight channel, so that the electric vehicles, the freight containers, and the turnover boxes can be transferred to corresponding freight channels according to needs of goods transporting. The automatic device may also scan and obtain the third identification code of the turnover box, the second identification code of the storage compartment and the first identification code of the freight container at each stage of the goods transporting, thereby obtaining the storage path of the goods.

Figure 22:
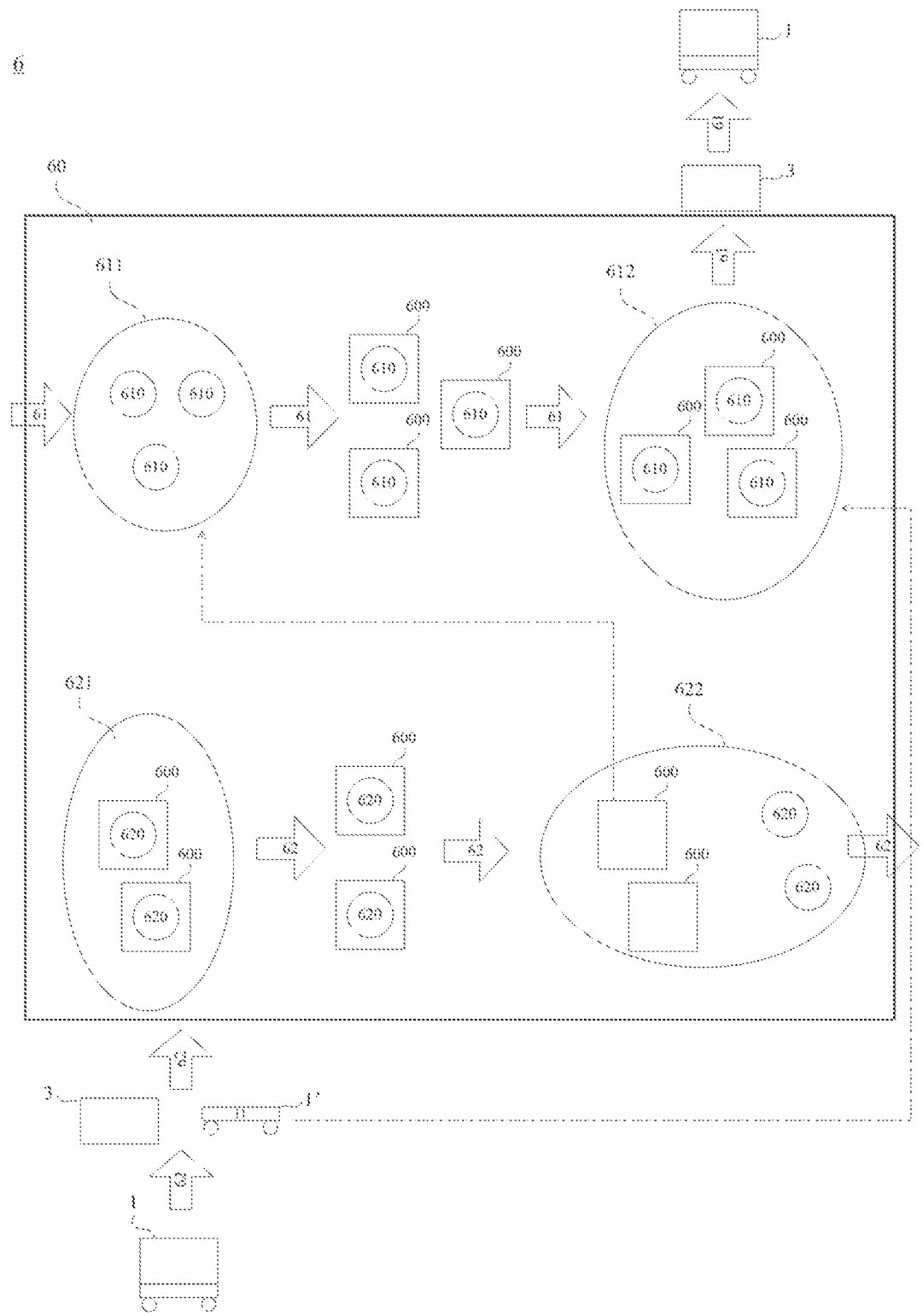
FIG. 22 is a schematic view of a distribution center according to an embodiment of the present disclosure.

FIG. 22 shows a structure of the distribution center in an embodiment. As shown in FIG. 22, an inward freight channel 61 and an outward freight channel 62 are provided in the distribution center 6. The inward freight channel 61 includes a receiving area 611 and a dispatch area 612. The receiving area 611 receives transferred first goods 610, loads the first goods 610 into corresponding turnover boxes 600 through the automatic device 60, and transports them to the dispatch area 612. Then the turnover boxes 600 together with the first goods 610 are loaded into corresponding freight container 3, and the freight container 3 is loaded into the electric vehicle 1 for automatic distribution. The outward freight channel 62 includes an unloading area 621 and a transfer area 622, and the electric vehicle 1 loaded with second goods 620 that needs to be transferred to other areas is received in the unloading area 621. The freight container 3 and the turnover boxes 600 containing the second goods 620 in the freight container 3 are sequentially unloaded by the automatic device 60. Next, the freight container 3 and the electric vehicle (marked as electric vehicle 1' in FIG. 22, from which the freight container 3 has been unloaded) can return to the dispatch area 612 to continue to deliver the first goods 610. The electric vehicle 1' can first reach a battery center to automatically replace a fully charged battery pack and then return to the dispatch area 612, and a replaced battery pack will be recharged automatically in the battery center, to be ready for use. The turnover boxes 600 containing the second goods 620 are transported by the automatic device 60 to the transfer area 622, and then the second goods 620 are taken out of the turnover boxes 600 and wait to be transferred to other corresponding distribution centers. The second goods 620 can be transferred by any existing transportation means. The turnover boxes 600 will be returned to the receiving area 611 by the automatic device 60.

Delivering process and receiving process of the automatic freighting method will be specifically described with two embodiments in the following. The automatic freighting method is mainly realized by the control cluster.

Figure 23:
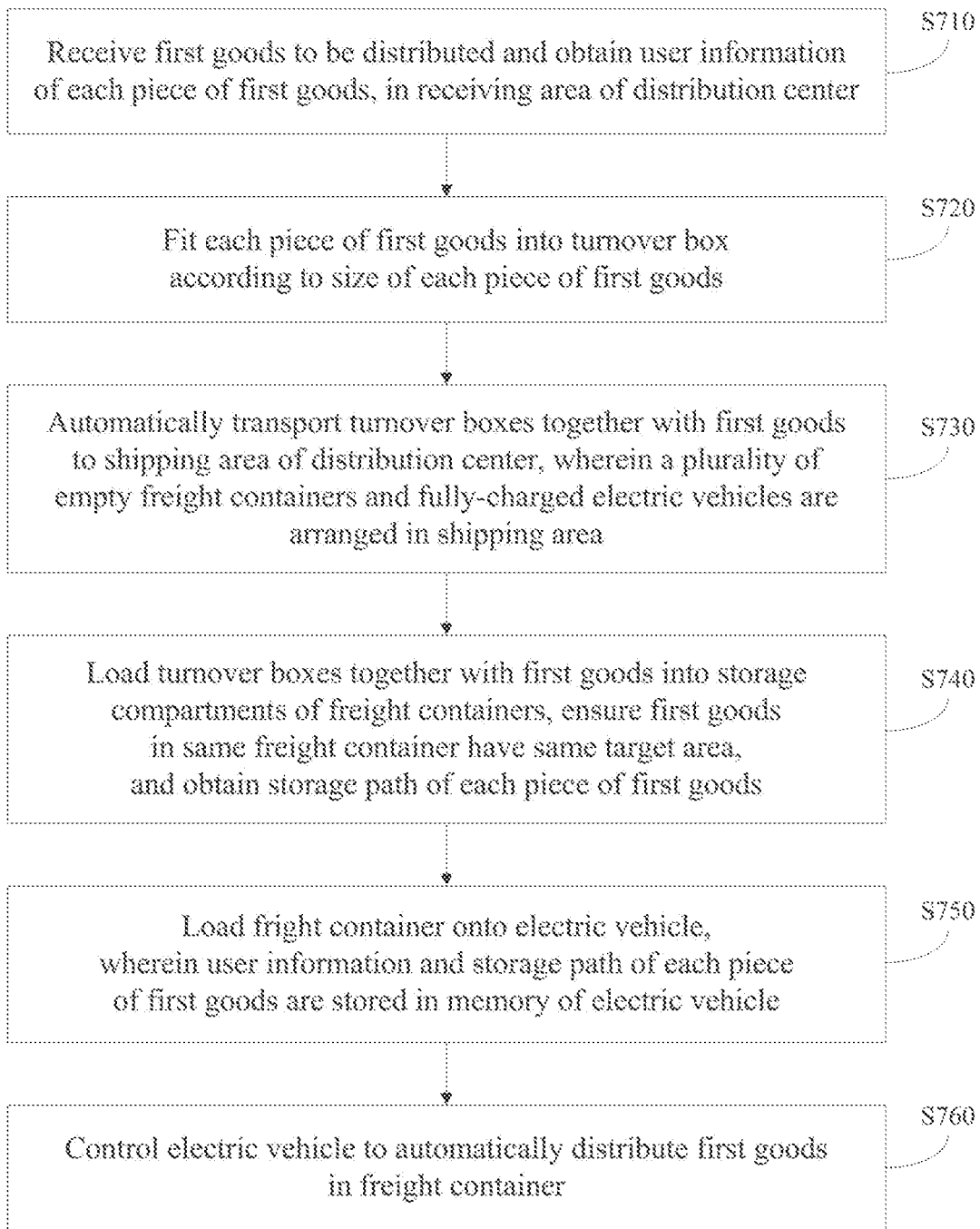
FIG. 23 and FIG. 24 are flow charts showing delivering steps of an automatic freighting method according to an embodiment of the present disclosure.
Figure 24:
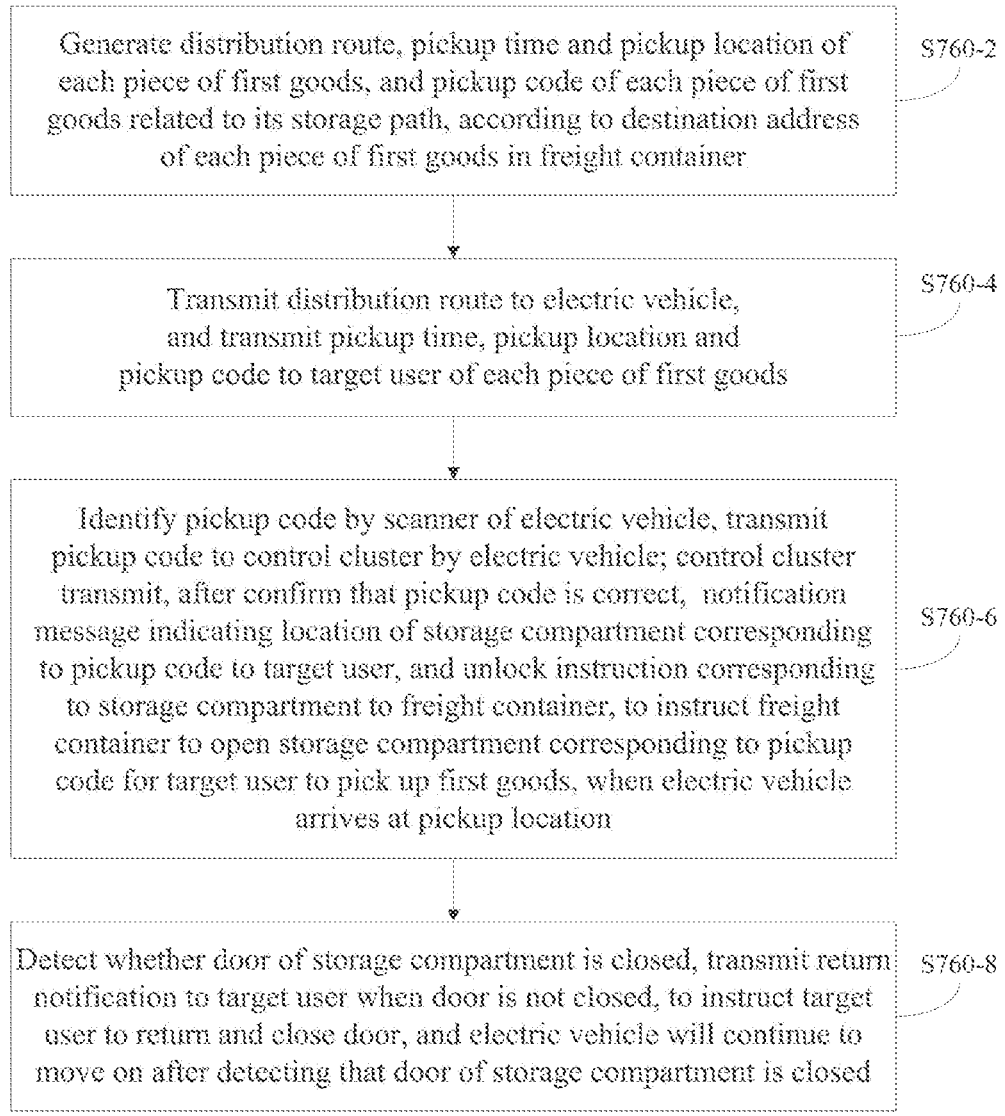

FIG. 23 and FIG. 24 show main steps of the delivering process of the automatic freighting method in the embodiment. Referring to FIG. 23, the automatic freighting method includes the following steps S710-S760. In step S710, the first goods to be distributed and obtaining user information of each piece of the first goods are received, in the receiving area of the distribution center; in step S720, each piece of the first goods is fitted into a turnover box according to size of the first goods, wherein the first goods can be loaded into the turnover boxes by the above-mentioned automatic device; in step S730, the turnover boxes together with the first goods are automatically transported to the dispatch area of the distribution center, wherein a plurality of empty freight containers and fully-charged electric vehicles are arranged in the dispatch area; in step S740, the turnover boxes together with the first goods are loaded into the storage compartments of the freight containers, making the first goods in a same freight container have a same target area, and obtaining storage path of each piece of the first goods; in step S750, the fright container is loaded on the carrying surface to form the electric vehicle, and the user information and the storage path of each piece of the first goods are stored in the memory of the electric vehicle; in step S760, the electric vehicle is controlled to automatically distribute the first goods in the freight container.

Wherein, the target area belongs to a distribution range of the distribution center, and is a small-scale distribution area pointed by the destination address of the first goods. In other words, the distribution center corresponds to a large distribution area, and there are many small distribution areas within the scope of the large distribution area of the distribution center. When distributing goods, the goods that point to a same small distribution area are allocated to a same group of the freight containers, and the same group of the freight containers are assigned to one or more electric vehicles. Therefore, each time the electric vehicle is assembled with a freight container, the electric vehicle can distribute first goods in a small distribution area, which saves resources and accelerates efficiency.

Further, referring to FIG. 24, a process of controlling the electric vehicle to automatically distribute the first goods in the freight container in step S760 specifically includes the following steps S760-2, S760-4, S760-6 and S760-8. In step S760-2, a distribution route, a pickup time and a pickup location of each piece of the first goods, and a pickup code of each piece of the first goods related to the storage path of the piece of the first goods are generated, according to the destination address of each piece of the first goods in the freight container. In step S760-4, the distribution route is transmitted to the electric vehicle, and the pickup time, the pickup location and the pickup code are transmitted to the target user of each piece of the first goods. Wherein, the pickup location is agreed with the target user and near the destination address. At the agreed pickup time, the electric vehicle arrives at the pickup location, and the target user also goes to the pickup location to pick up. For example, when the destination address of the target user is on a 15th floor of a building, an entrance of the building, i.e., an address of the building on the map can be the pickup location when agreed with the target user. In step S760-6, when the electric vehicle arrives at a pickup location, the pickup code is identified by the scanner of the electric vehicle, and the pickup code is transmitted to the control cluster by the electric vehicle; after the control cluster confirms that the pickup code is correct, a notification message indicating a location of the storage compartment corresponding to the pickup code is transmitted to the target user by the control cluster, and an unlock instruction corresponding to the storage compartment is transmitted to the freight container by the control cluster, which instructs the freight container to open the storage compartment corresponding to the pickup code for the target user to pick up the first goods. The target user should close the door of the storage compartment after receiving the first goods. And in step S760-8, whether the door of the storage compartment is closed is detected, a return notification is transmitted to the target user when the door is not closed, and the electric vehicle will continue to move on after detecting that the door of the storage compartment is closed. That is to say, the electric vehicle will continue to move on after the target user receives the first goods and closes the door of the storage compartment.

Through the above delivering process, the first goods can be automatically distributed in each distribution center, without manual participation throughout the process, which greatly speeds up the freight efficiency, and avoids errors and information leakage caused by human factors.

Figure 25:
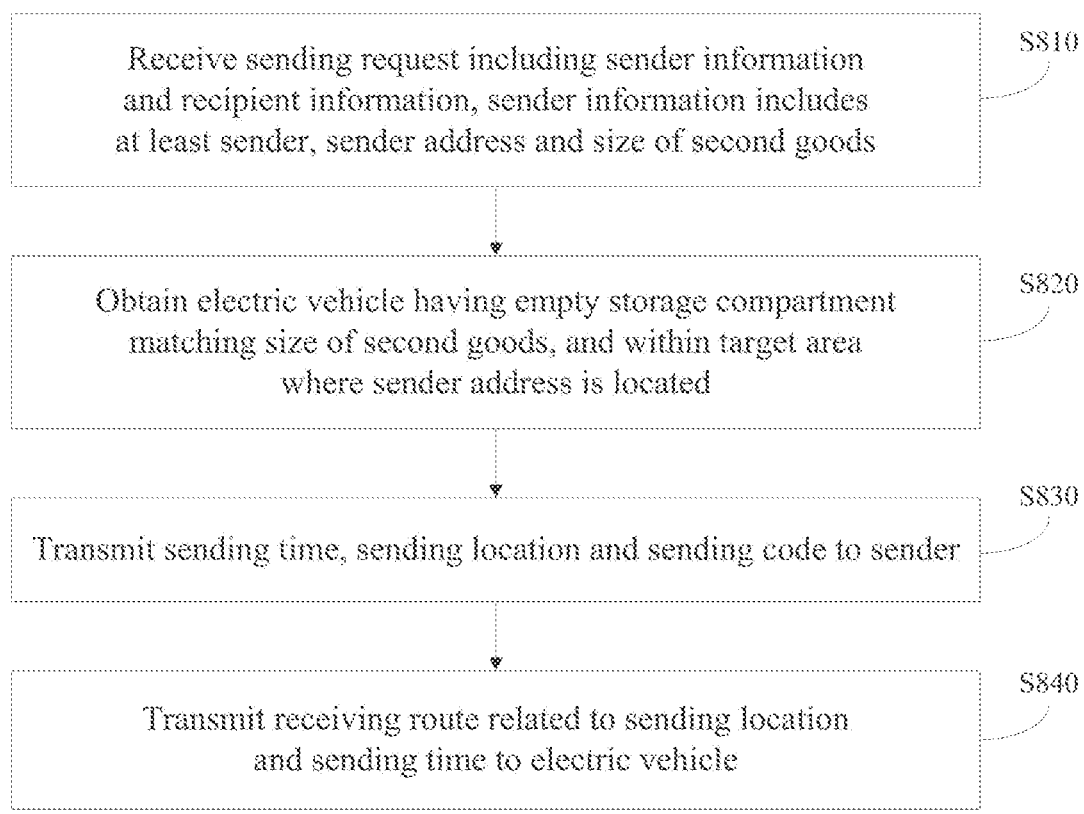
FIG. 25 and FIG. 26 are flow charts showing receiving steps of the automatic freighting method according to an embodiment of the present disclosure.
Figure 26:
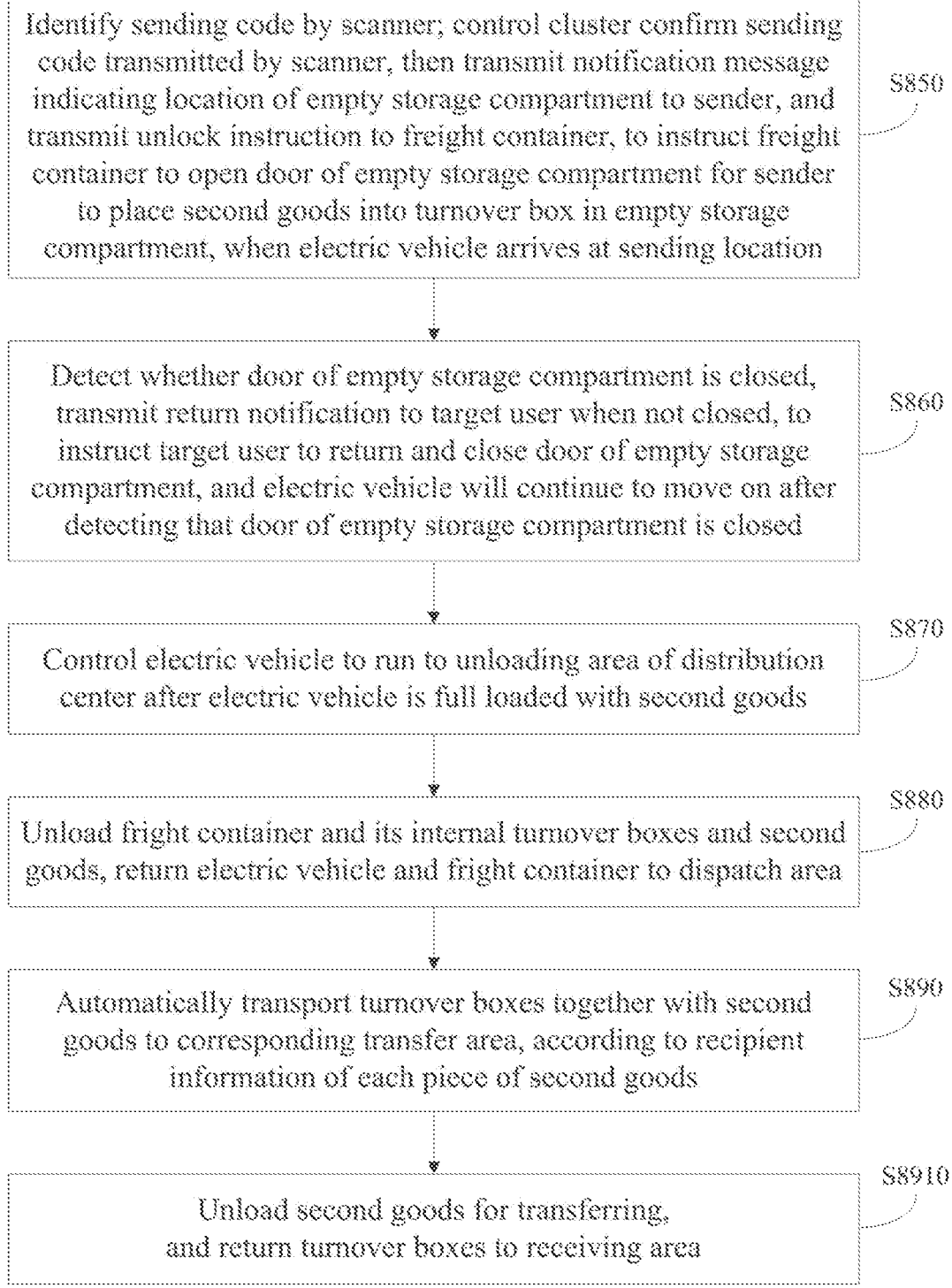

FIG. 25 and FIG. 26 show main steps of the receiving process of the automatic freighting method in the embodiment. Referring to FIG. 25, the automatic freighting method further includes the following steps S810, S820, S830 and S840. In step S810, a sending request including sender information and recipient information is received, wherein the sender information includes at least a sender, a sender address and size of a piece of second goods, and the sender information and recipient information are materials filled in by the sender online. In step S820, an electric vehicle with an empty storage compartment matching the size of the piece of the second goods and in a target area where the sender address is located is obtained. In step S830, a sending time, a sending location and a sending code are transmitted to the sender. And in step S840, a receiving route related to the sending location and the sending time is transmitted to the electric vehicle.

Further, referring to FIG. 26, the receiving process further includes following steps S850, S860, S870, S880, S890 and S8910. In step S850, when the electric vehicle arrives at the sending location, the sending code is identified and then transmitted, by the scanner, to the control cluster for confirmation; afterwards a notification message indicating a location of the empty storage compartment is transmitted to the sender by the control cluster, and an unlock instruction, instructing the freight container to open a door of the empty storage compartment for the sender to place the piece of the second goods into the turnover box in the empty storage compartment, is transmitted to the freight container by the control cluster. The sender should close the door of the storage compartment after placing the second goods. In step S860, detect whether the door of the storage compartment is closed, and transmit a return notification, informing the sender to return and close the door of the storage compartment, to the sender, when the door is not closed; and the electric vehicle will continue to move on after detecting that the door of the storage compartment is closed. In step S870, the electric vehicle is controlled to travel to the unloading area of the distribution center, when the electric vehicle is full loaded with the second goods. In step S880, the fright container and the turnover boxes and the second goods in the fright container are unloaded, and the electric vehicle and the fright container are returned to the dispatch area; wherein the electric vehicle can first arrive at the battery center to replace the fully charged battery pack, and the replaced battery pack will be automatically recharged. After returning to the dispatch area, the freight container can be loaded with new first goods, specifically, the turnover boxes containing the new first goods are fitted into the storage compartments with suitable capacities of the freight container. The freight container full-loaded with the new first goods is then loaded onto the electric vehicle for automatic distribution of the new first goods. In step S890, the turnover boxes together with the second goods are automatically transported to corresponding transfer areas, according to the recipient information of each piece of the second goods, wherein the turnover boxes and the second goods can be automatically transported by the above-mentioned automatic device. And in step S8910, the second goods are unloaded for transferring and the turnover boxes are returned to the receiving area. After returning to the receiving area, the turnover boxes will be loaded with new first goods, and then transported to the dispatch area to be loaded into the storage compartments of the freight container. The second goods in the transfer area can be transferred to other distribution centers by large trucks, or be transferred to an airport and then to remote distribution center in the cases of long distance. The first goods in other distribution centers can be transferred to the receiving area of the distribution center by the large trucks.

The receiving process is linked up with the delivering process. Therefore, in each distribution center, the first goods are automatically distributed and the second goods are automatically received, without manual participation throughout the entire process, which greatly speeds up the freight efficiency. The electric vehicle used for carrying goods is separated from the freight container, and the freight container can be easily installed onto and removed from the electric vehicle, the entire structure is simple and the installation is easy. The electric vehicle can be quickly replaced with a new fully charged battery pack, and the replaced battery pack can be sent to the battery center to be recharged for later use, which has high efficiency. The electric vehicle can transport goods in multiple freight containers, which saves costs and improves efficiency; and the electric vehicle can realize freighting with fully automation, high efficiency, high accuracy, low cost and high safety, without human error and information leakage.

Obviously, the above-mentioned embodiments of the present disclosure are merely examples for clearly illustrating the present disclosure, rather than limiting the implementation of the present disclosure. For those of ordinary skill in the art, various obvious changes, readjustments, and substitutions can be made without departing from the protection scope of the present disclosure. There is no need to exhaustively list all implementations. Any modification, equivalent replacement and improvement made within the spirit and principle of the present disclosure shall be included in the protection scope of the claims of the present disclosure.

What is claimed is:

1. An electric vehicle comprising a plurality of wheel assemblies installed on a lower surface of a chassis, wherein:
    the plurality of the wheel assemblies are independent of each other, and each of the wheel assemblies comprises a wheel, a driving device and a displacement device;
    the driving device is configured to drive the wheel to rotate, and the displacement device is configured to drive at least the wheel to move in a width direction of a vehicle body of the electric vehicle;
    wherein the displacement device, the driving device and the wheel are sequentially arranged from inside to outside along the width direction of the vehicle body;
    the driving device is connected to and drives the wheel through a rotating shaft; the displacement device is connected to the driving device through a telescopic shaft, and the displacement device drives the driving device and the wheel through the telescopic shaft;
    when in each of the wheel assemblies, the wheel comprises a plurality of tires arranged along the width direction of the vehicle body, the plurality of the tires are connected to the driving device through the rotating shaft;
    wherein the displacement device comprises a first electric motor fixed to the chassis, a first end of the telescopic shaft is telescopically connected to the first electric motor, and a second end of the telescopic shaft is connected to the driving device;
    wherein the driving device comprises a housing fixed to the chassis and a second electric motor accommodated in the housing, two opposite inner walls of the housing are provided with guide rails extending in the width direction of the vehicle body, and two opposite side walls of the second electric motor are connected to the guide rails through rotating pivots, respectively;
    when driven by the first electric motor, the second electric motor slides in the guide rails through the rotating pivots, and drives the wheel to move in the width direction of the vehicle body;
    when the wheel jumps in a direction perpendicular to the chassis, the second electric motor is driven to swing by the wheel through the rotating pivots, and the rotating pivots are rotated in the guide rails along with swing of the second electric motor.

2. The electric vehicle of claim 1, wherein a first end of the rotating shaft is rotatably connected to the second electric motor, and a second end of the rotating shaft is connected to the wheel through a first rotating joint; and
    the second end of the telescopic shaft is connected to the second electric motor through a second rotating joint;
    wherein the rotating shaft is connected to the chassis through a first elastic member capable of elastically stretching and compressing in the direction perpendicular to the chassis, a first end of the first elastic member is fixedly connected to the chassis, and a second end of the first elastic member is movably connected to the rotating shaft through a connector.

3. The electric vehicle of claim 1, wherein each of the wheel assemblies further comprises a lifting device through which the housing is connected to the chassis, the lifting device is an electric lifter or a second elastic member, and the lifting device may raise and lower in the direction perpendicular to the chassis, to adjust ground clearance of the chassis;
    wherein a side wall of the housing is connected to the chassis through a connecting rod, a first end of the connecting rod is fixedly connected to the chassis, and a second end of the connecting rod is connected to the side wall of the housing through a third rotating joint.

4. The electric vehicle of claim 1, wherein each of the wheel assemblies is provided with a wheel cover, comprising:
    a cover body covering outside the wheel;
    a prompt module provided on an outer surface of the cover body, wherein the prompt module is configured to generate prompt information when the wheel moves; and
    a soft waterproof sheet provided below a rear surface of the cover body.

5. An automatic driving method applied on the electric vehicle of claim 1, wherein the automatic driving method comprises steps of:
    transmitting a track width increasing signal to each of the wheel assemblies, to instruct the displacement device of each of the wheel assemblies to drive each wheel to extend away from a center of the electric vehicle, along the width direction of the vehicle body, when a running speed of the electric vehicle is greater than a first preset value;
    transmitting a track width decreasing signal to each of the wheel assemblies, to instruct the displacement device of each of the wheel assemblies to drive each wheel to retract towards the center of the electric vehicle, along the width direction of the vehicle body, when the running speed of the electric vehicle is less than a second preset value;
    wherein the first preset value is greater than the second preset value; and
    transmitting a first speed signal to inside group of the wheel assemblies, to instruct the driving devices of the inside group of the wheel assemblies to drive inside wheels to move forward at a first speed, and transmitting a second speed signal to outside group of the wheel assemblies, to instruct the driving devices of the outside group of the wheel assemblies to drive outside wheels to move forward at a second speed, when the electric vehicle is turning;
    wherein the second speed is greater than the first speed.

6. The automatic driving method of claim 5 further comprising:
    when the electric vehicle is turning, transmitting a retracting signal to the inside group of the wheel assemblies, to instruct the displacement devices of the inside group of the wheel assemblies to drive the inside wheels to retract towards the center of the electric vehicle, along the width direction of the vehicle body; and/or transmitting an extending signal to the outside group of the wheel assemblies, to instruct the displacement devices of the outside group of the wheel assemblies to drive the outside wheels to extend away from the center of the electric vehicle, along the width direction of the vehicle body.

7. The automatic driving method of claim 5 further comprising:
transmitting a height reducing signal to each of the wheel assemblies, to instruct a lifting device of each of the wheel assemblies to reduce ground clearance of the chassis, when the running speed of the electric vehicle is greater than the first preset value; and
transmitting a height increasing signal to each of the wheel assemblies, to instruct the lifting device of each of the wheel assemblies to increase the ground clearance of the chassis, when the electric vehicle is parking;
wherein, setting a plurality of preset values for the running speed of the electric vehicle, to adjust the track width of each of the wheel assemblies and/or the ground clearance of the chassis in stages.

8. The automatic driving method of claim 5 further comprising a step of adjusting driving parameters of the electric vehicle in real time, based on driving conditions of the electric vehicle, wherein the step comprises:
controlling the wheels to rotate at a same speed by the driving devices, controlling the track width along the width direction of the vehicle body to be increased as the running speed increases, by the displacement devices, and controlling ground clearance of the chassis to be reduced as the running speed increases, by lifting devices of the plurality of wheel assemblies, when the electric vehicle is running straight;
wherein each of the wheel assemblies is connected to the chassis through the lifting device;
controlling speed of the outside wheels to be greater than speed of the inside wheels by the driving devices, controlling the outside wheels to move outward relative to the inside wheels, along the width direction of the vehicle body, by the displacement devices, and controlling ground clearance of outside part of the chassis to be greater than ground clearance of inside part of the chassis by the lifting devices, when the electric vehicle is turning; and
controlling ground clearance of a part of the chassis located upstream of a slop to be less than ground clearance of a part of the chassis located downstream of the slop by the lifting devices, to reduce a gradient of the electric vehicle, when the electric vehicle passes the slope.

9. The automatic driving method of claim 5, wherein each of the wheel assemblies comprises at least two tires arranged in the width direction of the vehicle body, and the automatic driving method further comprises:
increasing track width along the width direction of the vehicle body between the tires of the wheel assembly located at a hollow, to avoid the hollow, by the displacement device of the wheel assembly located at the hollow, when the electric vehicle passes the hollow; or
driving the tires of the wheel assembly located at the hollow to extend or retract in the width direction of the vehicle body, to avoid the hollow, by the displacement device of the wheel assembly located at the hollow, when the electric vehicle passes the hollow.

10. The electric vehicle of claim 1, wherein the electric vehicle is used to carry goods, and the electric vehicle further comprises:

a fixing frame provided on a carrying surface of the electric vehicle, wherein the carrying surface is located on an upper surface of the chassis, and the fixing frame is provided with a sliding channel and a switch controlling at least the sliding channel;
a freight container capable of being pushed into the fixing frame through the sliding channel, wherein when the freight container is pushed into the fixing frame, the switch closes at least part of the sliding channel, making the freight container fixed to the carrying surface.

11. The electric vehicle of claim 10, wherein a plurality of storage compartments with different capacities are provided in the freight container, and each of the storage compartments is configured to store a piece of goods through a turnover box, and the storage compartment is replaceable, to make the freight container have combinations of storage compartments with different capacities;
the freight container further comprises a first memory storing user information and storage path for each piece of the goods, wherein the user information indicates a target user and a destination address of each piece of the goods, and the storage path indicates the turnover box and the storage compartment storing each piece of the goods;
wherein the storage path of each piece of the goods is generated according to a first identification code of the freight container, a second identification code of the storage compartment corresponding to the piece of the goods, and a third identification code of the turnover box corresponding to the piece of the goods.

12. The electric vehicle of claim 11, wherein the switch is a split type switch comprising a first switch contact provided on the freight container and a second switch contact provided on the fixing frame;
when the freight container is pushed into the fixing frame, the split type switch is switched on and the first memory exchanges data with the electric vehicle.

13. The electric vehicle of claim 10, wherein the fixing frame comprises a plurality of right-angle plates connected with each other, and side plates providing the sliding channel, the freight container is pushed into the fixing frame from the side plates, and part of side edges of the freight container is embedded in inner walls of the right-angle plates, and
the switch is an electrically controlled switch or a telescopic switch provided on the side plates;
wherein a plurality of rotatable cameras for detecting surroundings and aerials for the cameras to communicate with the electric vehicle are provided on the fixing frame, the cameras are provided at least at a front end, a rear end, and one or more sides of the electric vehicle along a forward direction, and the aerials are provided on the top of the fixing frame; and
one or more scanners, one or more talkers and one or more alarms are further provided on the fixing frame.

14. The electric vehicle of claim 10, wherein one or more sides of the freight container is provided with an electronic display screen for displaying mobile advertisement; and
the chassis of the electric vehicle is provided with a battery slot, and a battery pack of the electric vehicle is detachably installed in the battery slot.

15. An automatic freighting method applied on the electric vehicle of claim 10, wherein the automatic freighting method comprises steps of:
receiving first goods to be distributed and obtaining user information of each piece of the first goods, in a receiving area of a distribution center;

fitting each piece of the first goods into a turnover box according to a size of each piece of the first goods;

automatically transporting the turnover boxes together with the first goods to a dispatch area of the distribution center, wherein a plurality of empty freight containers and fully-charged electric vehicles are arranged in the dispatch area;

loading the turnover boxes together with the first goods into storage compartments of the freight containers, ensuring that the first goods in a same freight container have a same target area, and obtaining storage path of each piece of the first goods;

loading the fright container onto the carrying surface to form the electric vehicle, wherein the user information and the storage path of each piece of the first goods are stored in a memory of the electric vehicle; and controlling the electric vehicle to automatically distribute the first goods in the freight container.

16. The automatic freighting method of claim 15, wherein the step of controlling the electric vehicle to automatically distribute the first goods in the freight container comprises:

generating a distribution route, a pickup time and a pickup location of each piece of the first goods, and a pickup code of each piece of the first goods related to its storage path, according to a destination address of each piece of the first goods in the freight container;

transmitting the distribution route to the electric vehicle, and transmitting the pickup time, the pickup location and the pickup code to a target user of each piece of the first goods;

when the electric vehicle arrives at a pickup location, identifying a pickup code by a scanner of the electric vehicle, and opening a storage compartment corresponding to the pickup code for a target user to pick up one piece of the first goods; and detecting whether a door of the storage compartment is closed, and transmitting a return notification to the target user when the door is not closed, wherein the electric vehicle will continue to move on after detecting that the door of the storage compartment is closed.

17. The automatic freighting method of claim 15 further comprising:

receiving a sending request, wherein the sending request comprises sender information and recipient information, and the sender information comprises at least a sender, a sender address and a size of a piece of second goods;

obtaining an electric vehicle having an empty storage compartment matching the size of the piece of the second goods, and within a target area where the sender address is located;

transmitting a sending time, a sending location and a sending code to the sender; and transmitting a receiving route related to the sending location and the sending time to the electric vehicle.

18. The automatic freighting method of claim 17 further comprising:

identifying the sending code by a scanner and opening the empty storage compartment, when the electric vehicle arrives at the sending location;

detecting whether a door of the empty storage compartment is closed, and transmitting a return notification to the sender when the door is not closed, wherein the electric vehicle will continue to move on after detecting that the door of the empty storage compartment is closed;

controlling the electric vehicle to run to an unloading area of the distribution center after the electric vehicle is full-load with the second goods;

unloading the fright container and its internal turnover boxes and second goods, and returning the electric vehicle and the fright container to the dispatch area;

automatically transporting the turnover boxes together with the second goods to a corresponding transfer area, according to the recipient information of each piece of the second goods; and unloading the second goods for transferring, and returning the turnover boxes to the receiving area.

\* \* \* \* \*